(12) United States Patent
Shimizu et al.

(10) Patent No.: US 9,679,232 B2
(45) Date of Patent: Jun. 13, 2017

(54) ELECTRONIC APPARATUS

(71) Applicant: FUJI XEROX CO., LTD., Tokyo (JP)

(72) Inventors: Tatsuji Shimizu, Kanagawa (JP);
Yoshinori Awata, Kanagawa (JP);
Masahiro Ishiwata, Kanagawa (JP);
Tsutomu Nagaoka, Kanagawa (JP);
Keiichi Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/063,816

(22) Filed: Mar. 8, 2016

(65) Prior Publication Data

US 2017/0061266 A1    Mar. 2, 2017

(30) Foreign Application Priority Data

Aug. 27, 2015 (JP) ................. 2015-167995

(51) Int. Cl.
*G06K 15/00* (2006.01)
*H04N 1/00* (2006.01)
*G06F 3/12* (2006.01)

(52) U.S. Cl.
CPC ....... *G06K 15/408* (2013.01); *H04N 1/00344* (2013.01)

(58) Field of Classification Search
None
See application file for complete search history.

(56) References Cited

U.S. PATENT DOCUMENTS

| 6,542,844 B1* | 4/2003 | Hanna ............ G01R 31/31851 702/119 |
| 2016/0139811 A1* | 5/2016 | Ikeuchi ............ H03K 19/17752 711/170 |

FOREIGN PATENT DOCUMENTS

JP        2005-191872 A      7/2005

* cited by examiner

*Primary Examiner* — Dov Popovici
(74) *Attorney, Agent, or Firm* — Oliff PLC

(57) ABSTRACT

An electronic apparatus includes the following elements. A circuit forming device forms a circuit configured in accordance with configuration information. A first storage unit stores first configuration information externally obtained via a first communication line. The first configuration information is used for forming a first circuit implementing a function including a first communication function in the circuit forming device. A second storage unit stores second configuration information different from the first configuration information. The second configuration information is used for forming a second circuit implementing a function including the first communication function in the circuit forming device. A recovery controller performs control so that the second circuit is formed in the circuit forming device by using the second configuration information, upon the occurrence of an error in communication via the first communication line when the first circuit is formed in the circuit forming device by using the first configuration information.

11 Claims, 16 Drawing Sheets

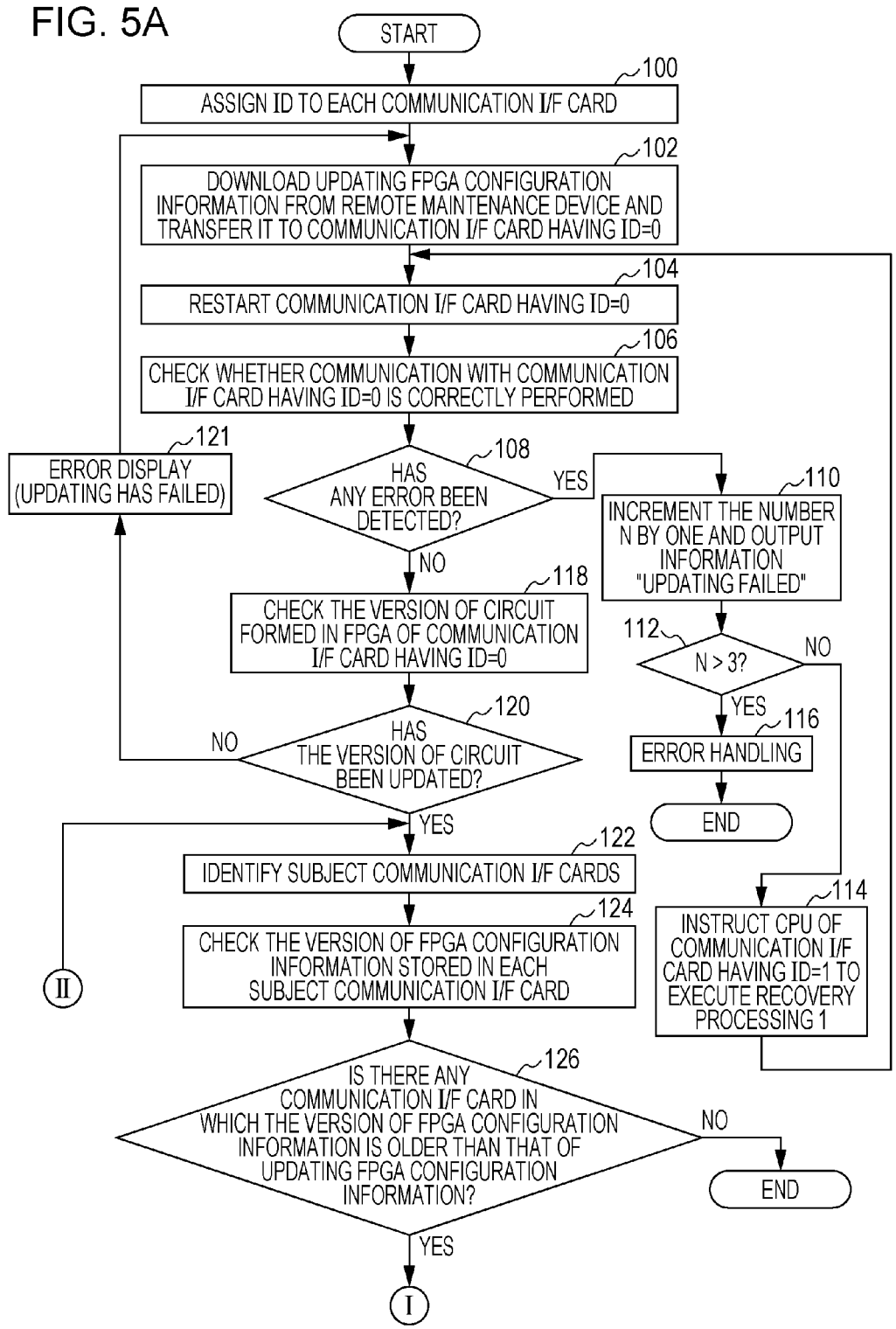

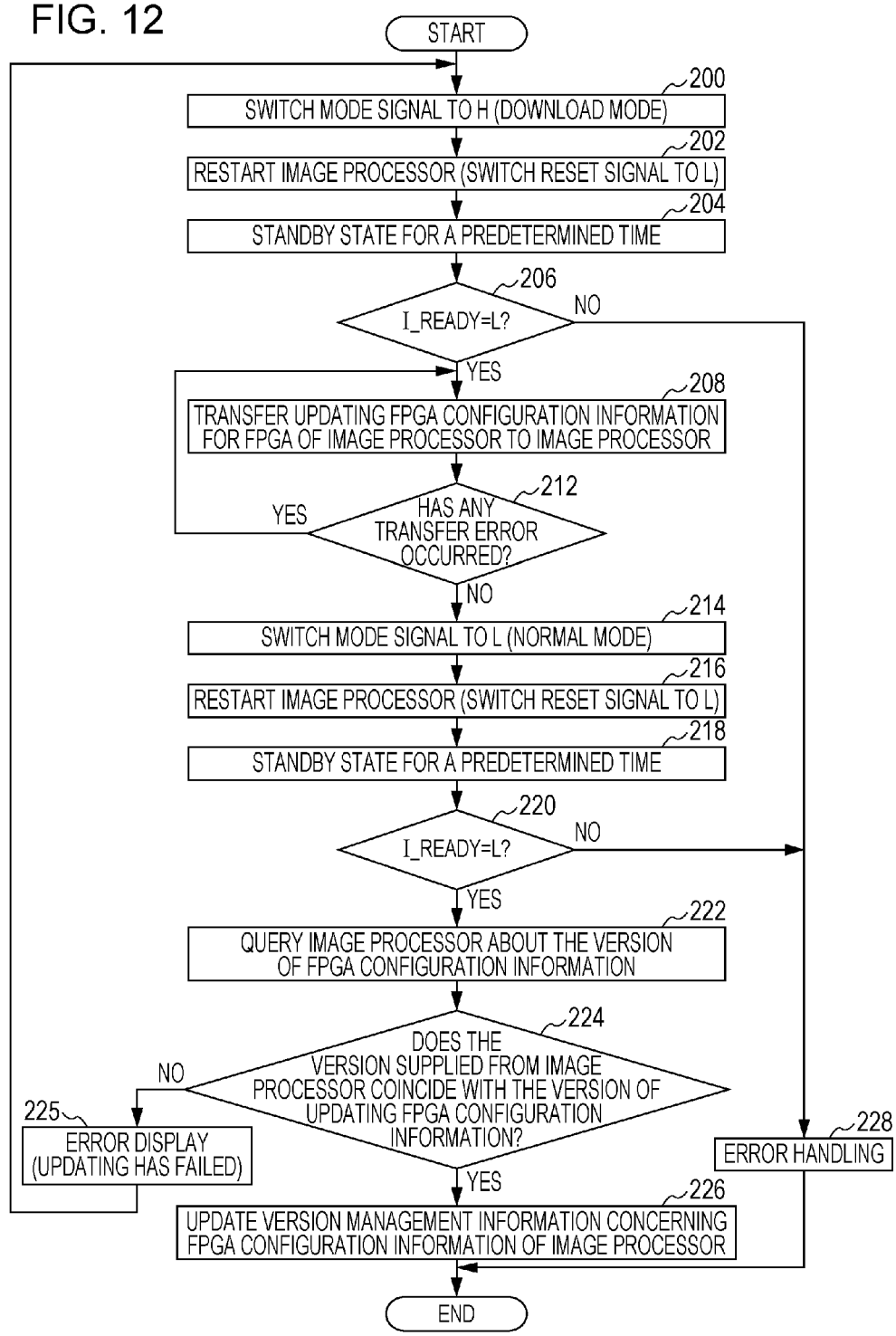

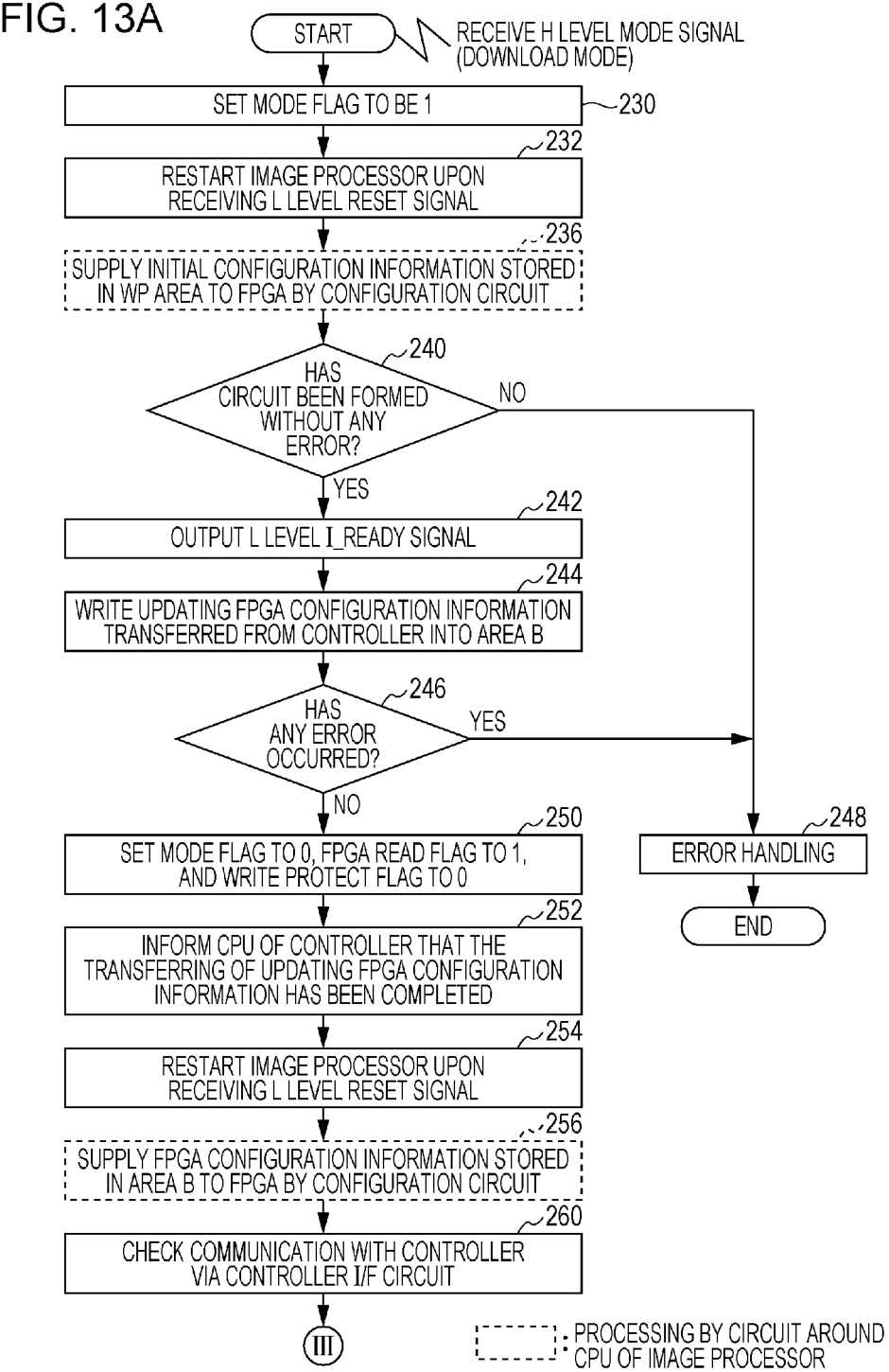

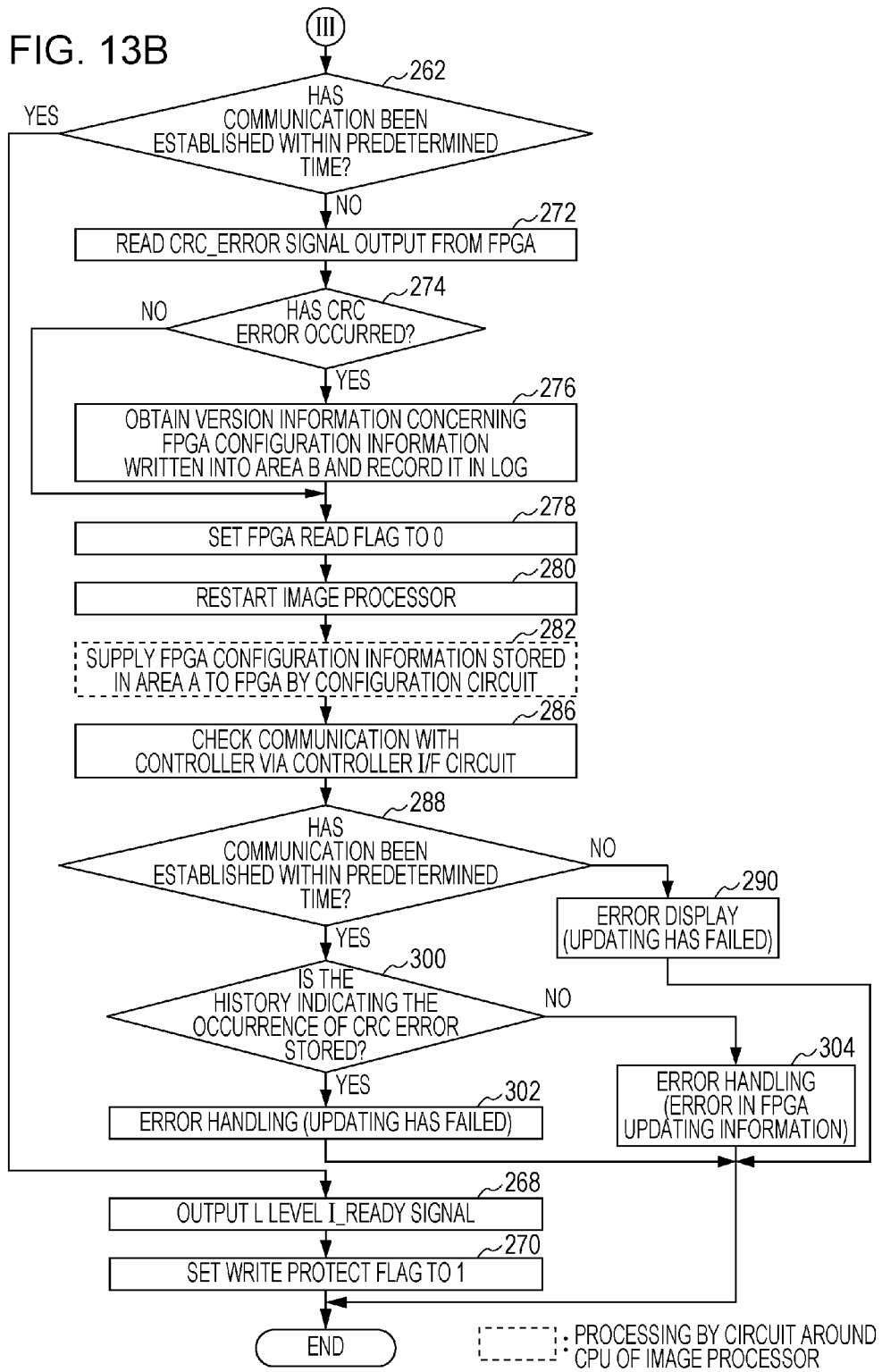

FIG. 14

| STATE | AREA A | | AREA B | | REMARKS |
|---|---|---|---|---|---|
| | WRITE PROTECT | VERSION OF FPGA CONFIGURATION INFORMATION | WRITE PROTECT | VERSION OF FPGA CONFIGURATION INFORMATION | |
| initial | SET | Ver1.0 | | — | • NO DATA IN AREA B (UNDEFINED DATA) |
| | VERSION UPGRADE SUCCEEDED | | | | |
| Update 1 | | Ver1.0 | SET | Ver2.0 | • READ FPGA CONFIGURATION INFORMATION FROM AREA B (WRITE PROTECTED)<br>• AREA A IS NOT WRITE PROTECTED |
| | VERSION UPGRADE SUCCEEDED | | | | |
| Update 2 | SET | Ver3.0 | | Ver2.0 | • READ FPGA CONFIGURATION INFORMATION FROM AREA A (WRITE PROTECTED)<br>• AREA B IS NOT WRITE PROTECTED |
| | VERSION UPGRADE FAILED → RETRANSFER FPGA CONFIGURATION INFORMATION → VERSION UPGRADE | | | | |
| Fault 1 | SET | Ver3.0 | | Ver4.0 | • UPDATING FPGA CONFIGURATION INFORMATION IS STORED IN AREA B BUT UPDATING HAS FAILED<br>• CONTINUE TO READ FPGA CONFIGURATION INFORMATION FROM AREA A (WRITE PROTECTED) |
| | | Ver3.0 | SET | Ver4.1 | • UPDATING SUCCEEDED<br>• READ FPGA CONFIGURATION INFORMATION FROM AREA B (WRITE PROTECTED)<br>• AREA A IS NOT WRITE PROTECTED |
| | VERSION UPGRADE SUCCEEDED | | | | |
| Update 3 | SET | Ver5.0 | | Ver4.1 | • READ FPGA CONFIGURATION INFORMATION FROM AREA A (WRITE PROTECTED)<br>• AREA B IS NOT WRITE PROTECTED |

ELECTRONIC APPARATUS

CROSS-REFERENCE TO RELATED APPLICATIONS

This application is based on and claims priority under 35 USC 119 from Japanese Patent Application No. 2015-167995 filed Aug. 27, 2015.

BACKGROUND

Technical Field

The present invention relates to an electronic apparatus.

SUMMARY

According to an aspect of the invention, there is provided an electronic apparatus including the following elements. A circuit forming device forms a circuit configured in accordance with configuration information. A first storage unit stores first configuration information. The first configuration information is externally obtained via a first communication line in a state in which a circuit which implements a first communication function of performing communication via the first communication line is at least formed in the circuit forming device. The first configuration information is used for forming a first circuit which implements a function including the first communication function in the circuit forming device. A second storage unit stores second configuration information, which is different from the first configuration information. The second configuration information is used for forming a second circuit which implements a function including the first communication function in the circuit forming device. A recovery controller performs control so that the second circuit will be formed in the circuit forming device by using the second configuration information, upon the occurrence of an error in communication via the first communication line when the first circuit is formed in the circuit forming device by using the first configuration information.

BRIEF DESCRIPTION OF THE DRAWINGS

An exemplary embodiment of the present invention will be described in detail based on the following figures, wherein:

FIGS. 5A and 5B are a flowchart illustrating field programmable gate array (FPGA) configuration information updating processing executed by a central processing unit (CPU) of the controller;

FIG. 12 is a flowchart illustrating image processor FPGA configuration information updating processing executed by the CPU of the controller;

FIGS. 13A and 13B are flowcharts illustrating FPGA updating processing executed by the CPU of the image processor; and FIG. 14 illustrates an example of the transition of area A and area B of a flash ROM in accordance with the updating of FPGA configuration information.

DETAILED DESCRIPTION

Figure 1:
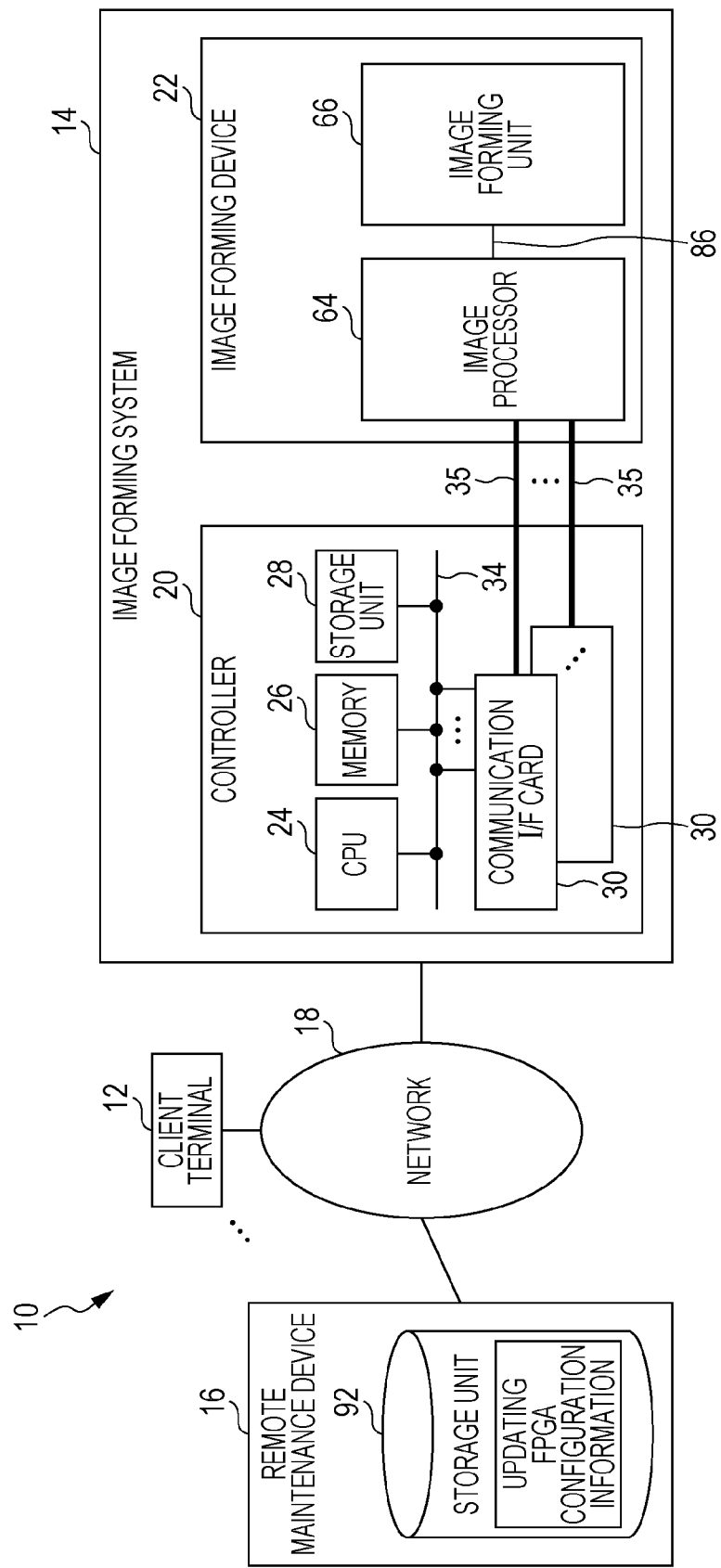
FIG. 1 is a block diagram schematically illustrating the configuration of a print system according to an exemplary embodiment.

An exemplary embodiment of the invention will be described below in detail with reference to the accompanying drawings. FIG. 1 illustrates a print system 10 according to the exemplary embodiment. The print system 10 includes a client terminal 12, an image forming system 14, and a remote maintenance device 16. These elements are connected to each other via a network 18.

In the print system 10, a user is able to give a print instruction to the image forming system 14 online by using the client terminal 12. The client terminal 12 includes a personal computer (PC) or a portable electronic device (an electronic device having an information processing function, such as a tablet terminal and a smartphone).

In the client terminal 12, a certain operating system (OS) and application programs required for creating documents are installed. In this exemplary embodiment, a user operates the client terminal 12 to start a desired application program and performs various operations to create a document to be printed. Upon completing the creation of a document, the user performs an operation to give an instruction to print the document. Then, print data indicating the document described in a page description language (PDL) is transmitted from the client terminal 12 to the image forming system 14 via the network 18.

The image forming system 14 includes a controller 20 and an image forming device 22. The controller 20 includes a central processing unit (CPU) 24, a memory 26, a storage unit 28, plural communication interface (I/F) cards 30, and a communication I/F unit 32 (see FIG. 2). These elements are connected to each other via a bus 34. The communication I/F unit 32 is connected to the network 18 via a communication line, and controls communication performed between the controller 20 and each of the client terminal 12 and the remote maintenance device 16 via the network 18. The communication I/F cards 30 are connected to an image processor 64 (which will be discussed later) of the image forming device 22 via communication lines 35. The communication I/F cards 30 perform communication with the CPU 24 via the bus 34 and also perform communication with the image processor 64 of the image forming device 22 via the communication lines 35.

Figure 2:
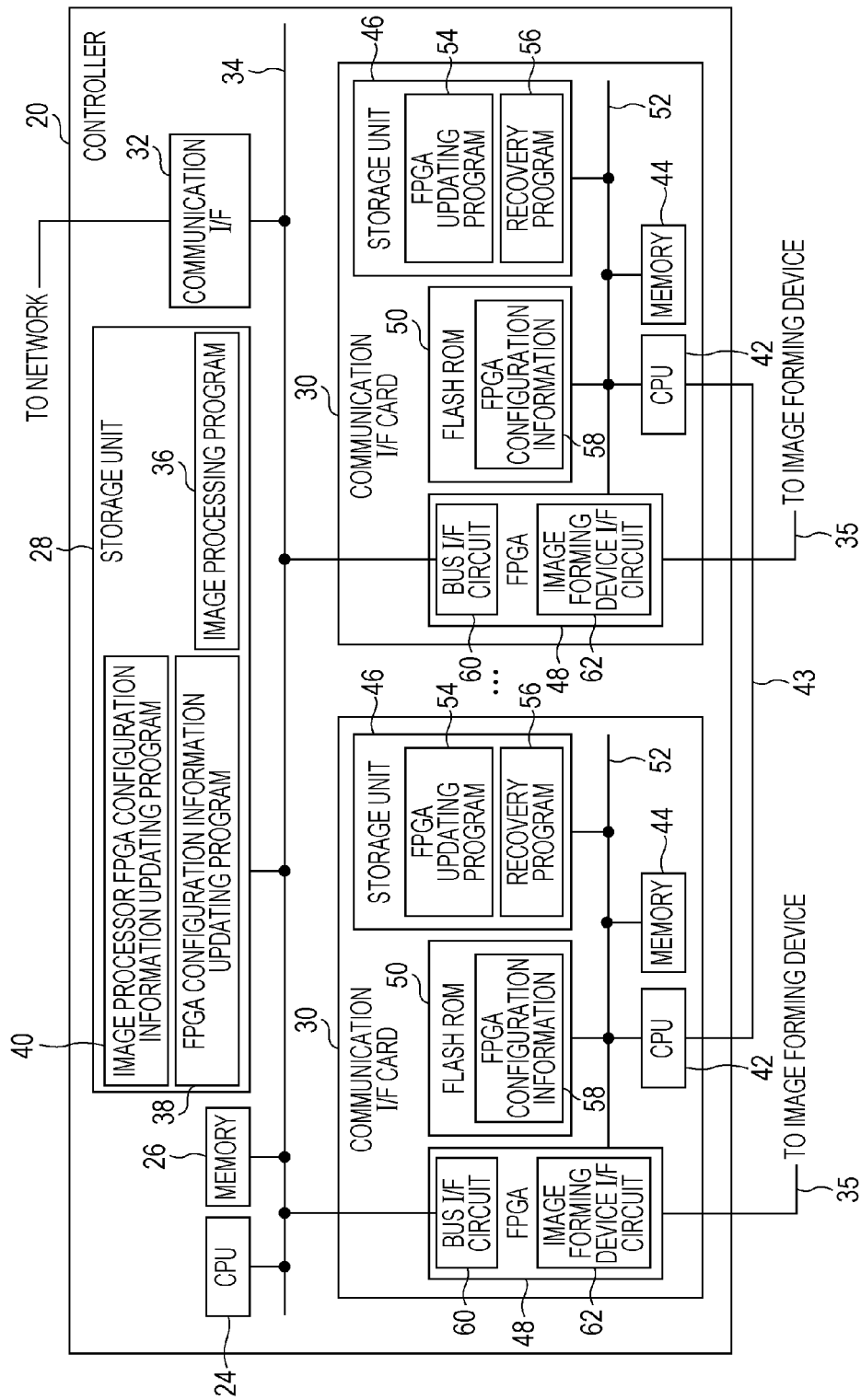
FIG. 2 is a block diagram schematically illustrating the configuration of a controller.

The storage unit 28 is implemented using a non-volatile storage medium, such as a hard disk drive (HDD) and a flash memory. As shown in FIG. 2, in the storage unit 28, an image processing program 36, a field programmable gate array (FPGA) configuration information updating program 38, and an image processor FPGA configuration information updating program 40 are stored.

By executing the image processing program 36, the CPU 24 interprets print data received from the client terminal 12 and performs predetermined image processing on the print data, and then performs processing for converting the print data into raster image data (bitmap print image data) of each of color components (for example, C, M, Y, K and other special colors) for each page. As the above-described image processing performed by the CPU 24, various known image processing operations may be performed, for example, resolution conversion processing, may be performed. The CPU 24 may first convert the print data into intermediate data and perform image processing (for example, optimized image processing according to the type of image element included in each page of the document), and then convert the intermediate data into bitmap print image data.

The FPGA configuration information updating program 38 is a program for executing FPGA configuration information updating processing by the CPU 24. The image processor FPGA configuration information updating program 40 is a program for executing image processor FPGA configuration information updating processing by the CPU 24. These processing operations will be discussed later.

Each communication I/F card 30 includes a CPU 42, a memory 44, a storage unit 46, a FPGA 48, and a flash read only memory (ROM) 50. These elements are connected to each other via a bus 52. The CPUs 42 of the individual communication I/F cards 30 are connected to each other via a communication line 43, and are able to perform local communication (for example, universal asynchronous receiver-transmitter (UART)/Local Net) with each other via the communication line 43.

The storage unit 46 is implemented using a non-volatile storage medium, such as a HDD and a flash memory. In the storage unit 46, a FPGA updating program 54 and a recovery program 56 are stored. The FPGA updating program 54 is a program for executing FPGA updating processing by the CPU 42. The recovery program 56 is a program for executing recovery processing by the CPU 42. These processing operations will be discussed later.

In the flash ROM 50, FPGA configuration information 58 used for forming a circuit in the FPGA 48 is stored. In this exemplary embodiment, by using the FPGA configuration information 58 for forming a circuit in the FPGA 48, a bus I/F circuit 60 and an image forming device I/F circuit 62 are formed in the FPGA 48, as circuits configured in accordance with the FPGA configuration information 58. The bus I/F circuit 60 is used for controlling communication performed between the communication I/F card 30 and the CPU 24 via the bus 34. The image forming device I/F circuit 62 is used for controlling communication performed between the communication I/F card 30 and the image processor 64 of the image forming device 22 via the communication line 35.

In this exemplary embodiment, the storage unit 46 storing the FPGA updating program 54 and the flash ROM 50 storing the FPGA configuration information 58 are separately provided. However, the invention is not restricted to this configuration. The FPGA updating program 54 and the FPGA configuration information 58 may be stored in the same storage unit (for example, a flash ROM).

As shown in FIG. 1, the image forming device 22 includes the image processor 64 and an image forming unit 66, which are connected to each other via a communication line 86.

Figure 3:
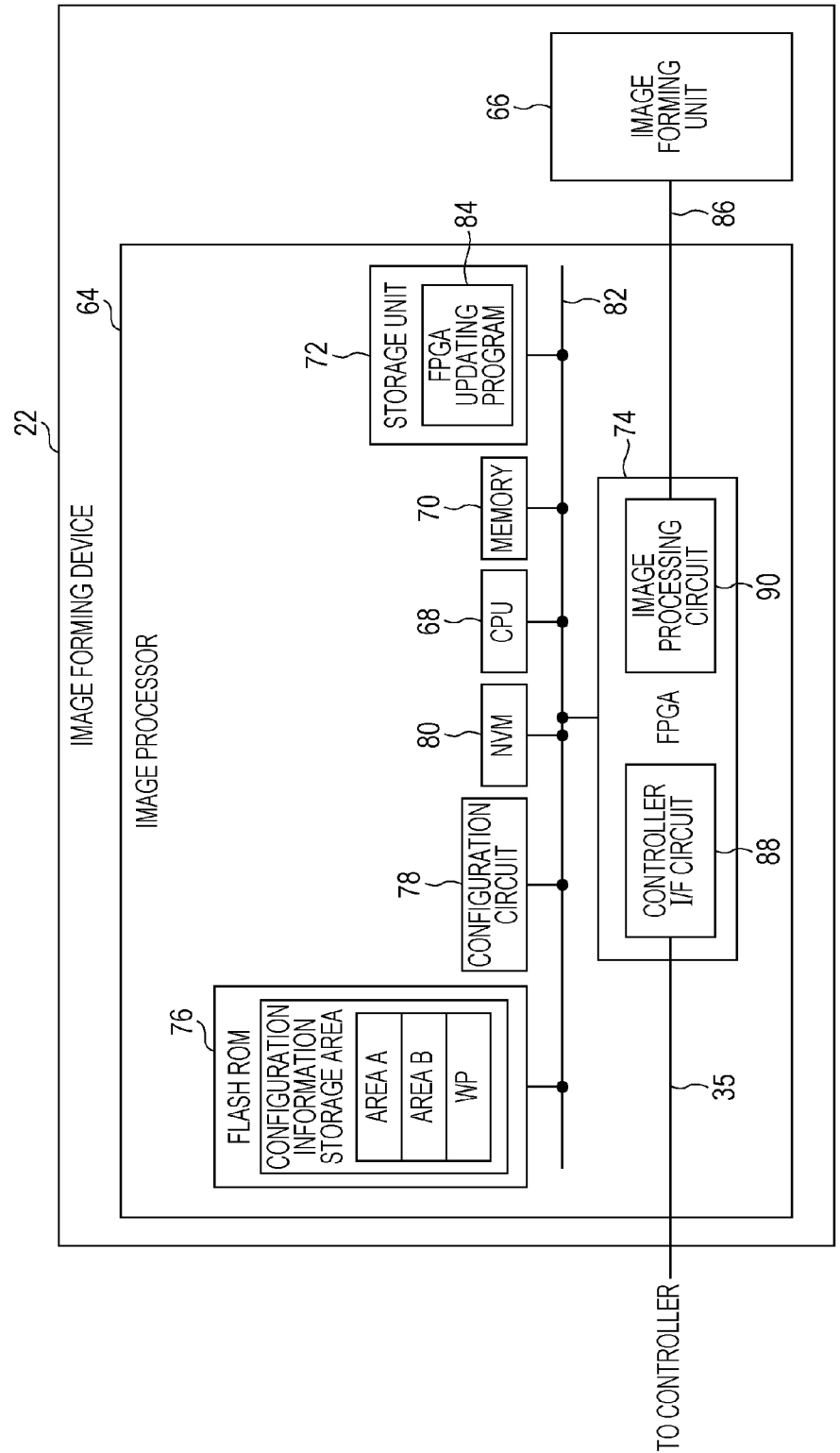
FIG. 3 is a block diagram schematically illustrating the configuration of an image forming device (image processor)

As shown in FIG. 3, the image processor 64 includes a CPU 68, a memory 70, a storage unit 72, a FPGA 74, a flash ROM 76, a configuration circuit 78, and a non-volatile memory (NVM) 80. These elements are connected to each other via a bus 82. The storage unit 72 is implemented using a non-volatile storage medium, such as a HDD and a flash memory. The NVM 80 is implemented using an electrically erasable programmable read only memory (EEPROM), for example. In the storage unit 72, a FPGA updating program 84 is stored. The FPGA updating program 84 is a program for executing the FPGA updating processing by the CPU 68. This processing will be discussed later.

In the flash ROM 76, three storage areas, that is, an area A, an area B, and a WP (Write Protect) area, are provided as storage areas for storing FPGA configuration information used for forming a circuit in the FPGA 74. In the WP area, FPGA configuration information without errors, that is, it has been verified that a correct circuit would be formed in the FPGA 74 by using this FPGA configuration information (hereinafter this information will be called "initial configuration information"), is written in advance at the time of the shipping of the image forming device 22. In contrast, FPGA configuration information is written into the area A and the area B by the execution of FPGA updating processing (FIGS. 13A and 13B), which will be discussed later.

In this exemplary embodiment, by using FPGA configuration information stored in a storage area in the flash ROM 76 for forming a circuit in the FPGA 74, a controller I/F circuit 88 and an image processing circuit 90 are formed in the FPGA 74, as circuits configured in accordance with the FPGA configuration information. The controller I/F circuit 88 is used for controlling communication performed between the communication I/F card 30 of the controller 20 and the image processor 64 via the communication line 35. The image processing circuit 90 is used for performing predetermined image processing on print image data received from the controller 20 and for controlling communication performed between the image processor 64 and the image forming unit 66 via the communication line 86.

Examples of image processing performed by the image processing circuit 90 are screen processing and color conversion using a multidimensional lookup table on bitmap print image data. However, part of such image processing may be executed by the CPU 68 of the image processor 64.

Figure 4:
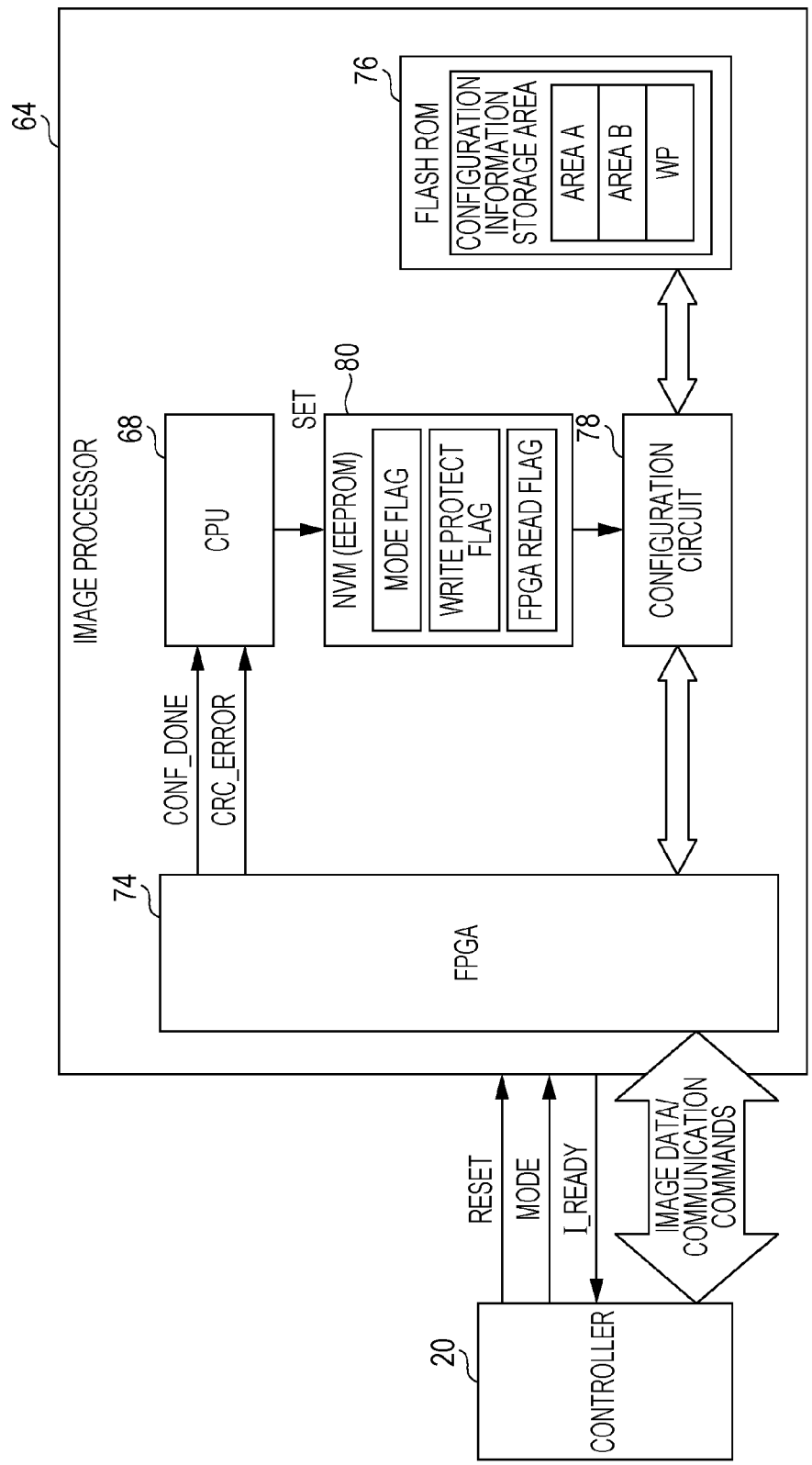
FIG. 4 is a schematic diagram illustrating details of the image processor and signals transmitted and received between the controller and the image processor and between individual elements of the image processor.

As shown in FIG. 4, in the NVM 80, storage areas for three flags, that is, a MODE flag, a WRITE protect flag, and a FPGA READ flag, are provided. These flags are set by the CPU 68, and details thereof will be discussed later. On the basis of the values of the flags stored in the NVM 80, the configuration circuit 78 selects a storage area from which FPGA configuration information is read, from among the three storage areas provided in the flash ROM 76, and then outputs the FPGA configuration information read from the selected storage area to the FPGA 74.

The image forming unit 66 prints an image of a document on recording paper, on the basis of print image data received from the image processor 64. In this case, the image forming unit 66 may form full-color toner images and transfer the toner images onto recording paper by using an electrophotographic process, thereby printing color images on recording paper. However, the method for printing images on recording paper is not restricted to the electrophotographic process. Other printing methods, such as thermal, heat transfer, and inkjet methods, may be used for printing images on plain paper or thermal paper.

The remote maintenance device 16 includes a storage unit 92. If FPGA configuration information used for forming a circuit in the FPGA 48 provided in the communication I/F card 30 of the controller 20 or in the FPGA 74 provided in the image processor 64 of the image forming device 22 is updated (if a new version of FPGA configuration information is released), the updated FPGA configuration information (hereinafter called "updating FPGA configuration information") is stored in the storage unit 92. Upon receiving an instruction from an operator, the remote maintenance device 16 communicates with the controller 20 via the network 18 and performs processing for distributing updating FPGA configuration information (a new version of FPGA configuration information) stored in the storage unit 92 to the controller 20.

In the related art, in an electronic apparatus including a circuit forming device, such as a FPGA, for forming a circuit configured in accordance with configuration information, the updating of this configuration information is usually performed in the following manner. A service engineer first stops operating the electronic apparatus and then rewrites configuration information stored in a flash ROM by using a tool. On the other hand, for the purpose of decreasing the suspension time of an electronic apparatus and reducing the work and the time to update configuration information, the following approach is also taken to update configuration information. Updating configuration information is downloaded from an external source, such as a server, and configuration information stored in a flash ROM is automatically overwritten with the downloaded updating configuration information.

It may be, however, possible that the electronic apparatus be powered OFF while configuration information is being updated. Accordingly, in the above-described approach, the updating of the configuration information may fail due to the superposition of an error on the configuration information or power OFF of the electronic apparatus.

In an electronic apparatus in which a circuit implementing a communication function is formed in a circuit forming device and configuration information is obtained by using this communication function, if the updating of configuration information fails, the communication function is broken down and is unable to communicate with an external source. It is thus no longer possible to receive configuration information again from the external source to retry to update the configuration information. In this case, manual work, such as the replacement of a substrate on which the circuit forming device is mounted, is required.

In the print system 10 of this exemplary embodiment, the bus I/F circuit 60 is formed in the FPGA 48 provided in the communication I/F card 30 of the controller 20, and the communication I/F card 30 receives updating FPGA configuration information 58 via the bus I/F circuit 60. Accordingly, if, in one communication I/F card 30, the updating of the FPGA configuration information 58 stored in the flash ROM 50 fails, this communication I/F card 30 is no longer able to communicate with an external source via the bus I/F circuit 60 and is thus unable to receive updating FPGA configuration information again via the bus I/F circuit 60.

In the print system 10 of this exemplary embodiment, the controller I/F circuit 88 is formed in the FPGA 74 provided in the image processor 64 of the image forming device 22, and the image processor 64 receives updating FPGA configuration information via the controller I/F circuit 88. Accordingly, if the updating of the FPGA configuration information stored in the flash ROM 76 fails, the image processor 64 is no longer able to communicate with the controller 20 via the controller I/F circuit 88 and is thus unable to receive updating FPGA configuration information again via the controller I/F circuit 88.

In this exemplary embodiment, therefore, if the updating of FPGA configuration information fails in one communication I/F card 30, the existing version of FPGA configuration information is transferred to this communication I/F card 30 from another communication I/F card 30 via the communication line 43. Then, the FPGA 48 in this communication I/F card 30 is reconfigured by using the existing version of FPGA configuration information, thereby recovering this communication I/F card 30 from a failure to update the FPGA configuration information. If the updating of FPGA configuration information fails in the image processor 64, the FPGA 74 is reconfigured by using the existing version of FPGA configuration information stored in another configuration-information storage area of the flash ROM 76, thereby recovering the image processor 64 from a failure to update the FPGA configuration information.

The updating of the FPGA configuration information 58 stored in the flash ROM 50 of a communication I/F card 30 of the controller 20 will be discussed below with reference to FIGS. 5A through 10. Upon receiving, from the remote maintenance device 16, information indicating an instruction to update the FPGA configuration information 58 used for reconfiguring the FPGA 48 (forming a circuit) of the communication I/F card 30, the controller 20 executes FPGA configuration information updating processing shown in FIGS. 5A and 5B as a result of the CPU 24 executing the FPGA configuration information updating program 38.

In step 100 of FIG. 5A, for identifying all communication I/F cards 30 provided in the controller 20, the CPU 24 of the controller 20 assigns different IDs to the communication I/F cards 30. A description will be given below, assuming that the total number of communication I/F cards 30 is two and that ID=0 is assigned to one communication I/F card 30 and ID=1 is assigned to the other communication I/F card 30.

Figure 6:
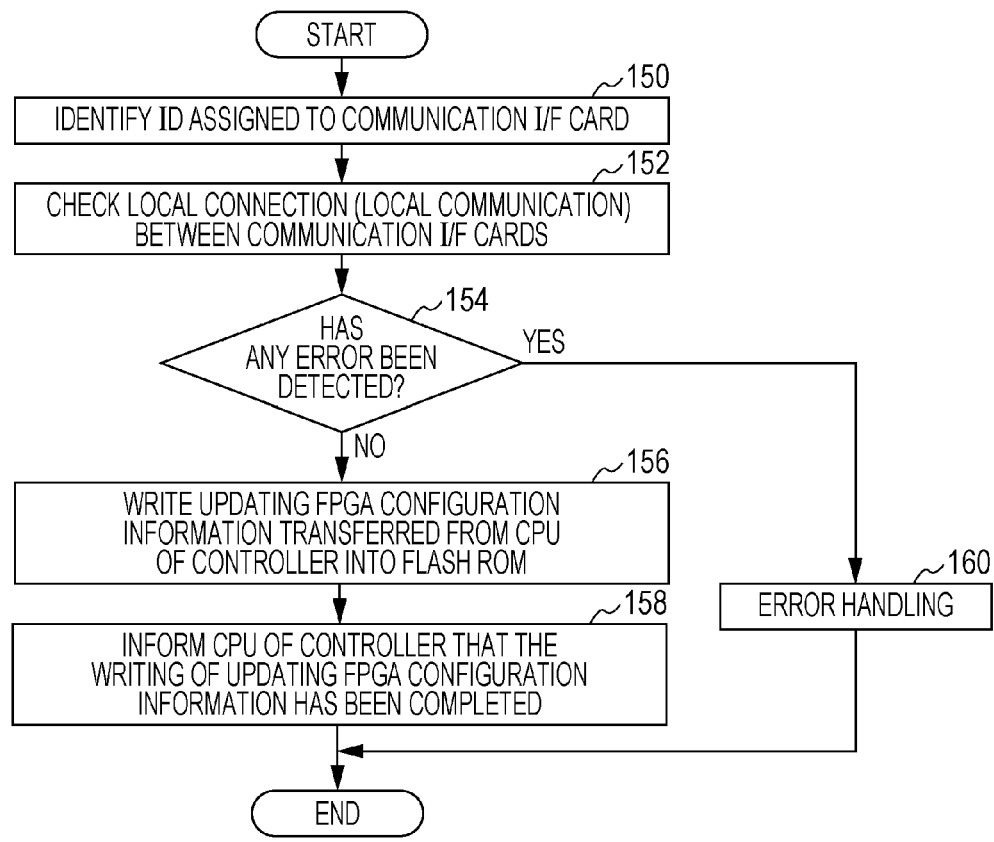
FIG. 6 is a flowchart illustrating FPGA updating processing executed by a CPU of a communication interface (I/F) card.
Figure 9:
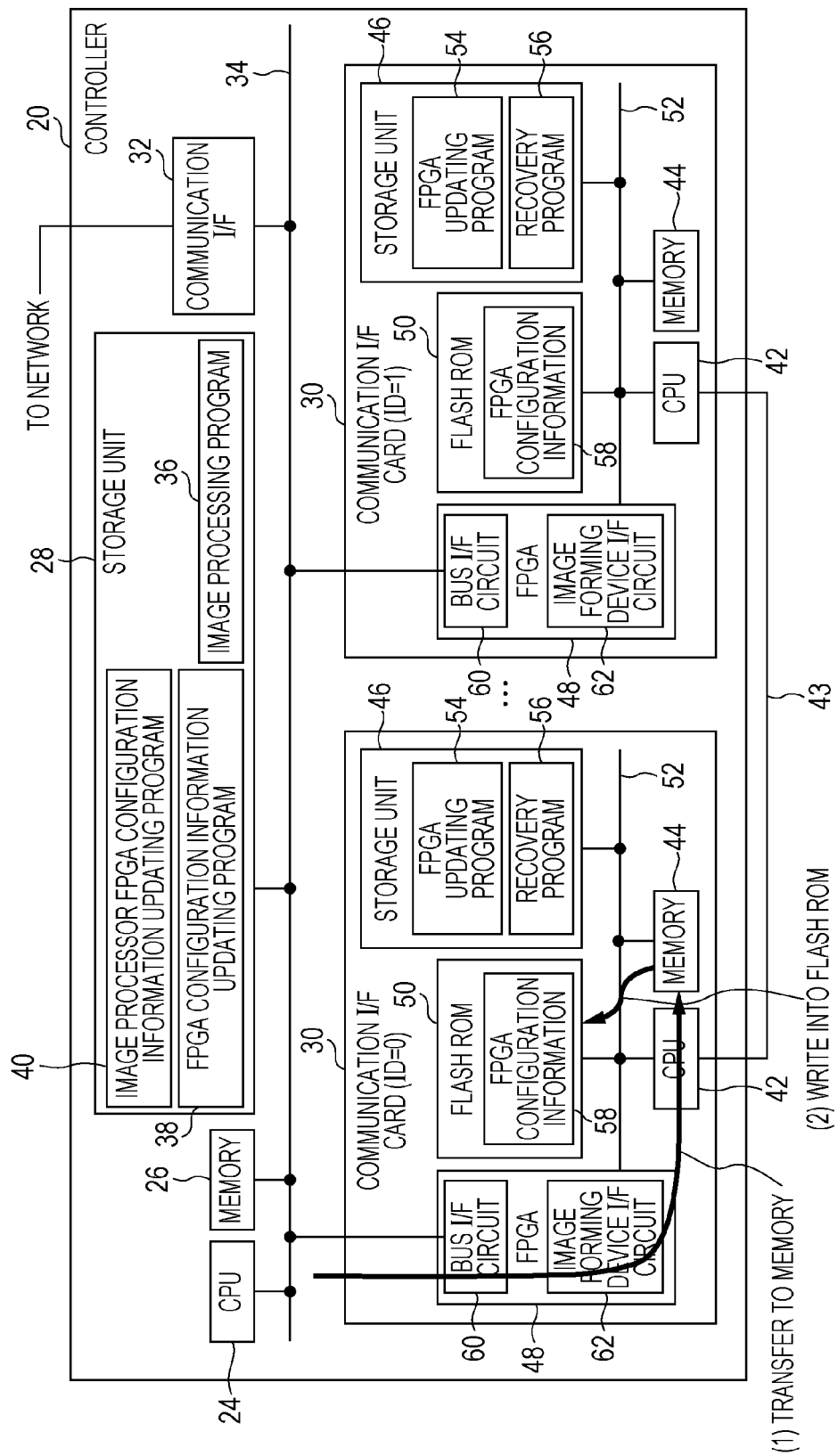
FIG. 9 is a schematic diagram illustrating an example of the flow of FPGA configuration information within the controller.

Then, in step 102, the CPU 24 of the controller 20 downloads updating FPGA configuration information used for reconfiguring the FPGA 48 (forming a circuit) of the communication I/F card 30 from the remote maintenance device 16 via the network 18, and temporarily stores the downloaded updating FPGA configuration information in the memory 26. Then, the CPU 24 transfers the updating FPGA configuration information stored in the memory 26 to the communication I/F card 30 having ID=0 via the bus 34. Upon receiving the updating FPGA configuration information from the CPU 24 of the controller 20, the CPU 42 of the communication I/F card 30 executes the following FPGA updating processing (FIG. 6). As shown in FIG. 9, the CPU 42 temporarily stores the updating FPGA configuration information in the memory 44, and then overwrites FPGA configuration information stored in the flash ROM 50 by this updating FPGA configuration information. The CPU 42 then informs the CPU 24 of the controller 20 that the updating of FPGA configuration information has been completed. Details of the FPGA updating processing will be discussed later.

In step 102 of FIG. 5A, upon downloading the updating FPGA configuration information from the remote maintenance device 16, the CPU 24 of the controller 20 immediately transfers the updating FPGA configuration information to the communication I/F card 30. However, the invention is not restricted to this configuration. Alternatively, the CPU 24 of the controller 20 may temporarily store the downloaded updating FPGA configuration information in the storage unit 28. Then, when a predetermined situation arises, the CPU 24 may read the updating FPGA configuration information from the storage unit 28 and transfer it to the communication I/F card 30. Examples of the predetermined situation is a situation where the image forming system 14 is not receiving print data from the client terminal 12 and the communication I/F card 30 having ID=0 is not performing communication and a situation where the frequency of the use of the image forming system 14 is decreased to a certain threshold.

In step 104, upon receiving information that the writing of the updating FPGA configuration information has been completed from the communication I/F card 30 having ID=0, the CPU 24 of the controller 20 restarts the communication I/F card 30 having ID=0. In step 104, the CPU 24 may restart the entire controller 20. As a result of restarting the communication I/F card 30 having ID=0, in the communication I/F card 30 having ID=0, the updating FPGA configuration information is read from the flash ROM 50 and is used for reconfiguring the FPGA 48. As a result, in the FPGA 48, circuits configured in accordance with the updating FPGA configuration information (for example, the bus I/F circuit 60 and the image forming device I/F circuit 62) are formed.

Upon completing the restarting of the communication I/F card 30 having ID=0, in step 106, the CPU 24 of the controller 20 checks whether or not it can correctly perform communication with the communication I/F card 30 having ID=0 via the bus 34. The purpose of step 106 is to check whether or not the communication function performed by the bus I/F circuit 60 formed in the FPGA 48 is functioning properly. In this exemplary embodiment, since the image forming device I/F circuit 62 used for communicating with the image forming device 22 is also formed in the FPGA 48, the CPU 24 may also check whether or not the communication function performed by the image forming device I/F circuit 62 is functioning properly. Then, in step 108, the CPU 24 of the controller 20 determines whether or not any error has been detected in communication check in step 106.

If it is determined in step 108 that an error has been detected in communication check in step 106, the CPU 24 of the controller 20 proceeds to step 110. In this case, the CPU 24 of the controller 20 is not able to correctly perform communication with the communication I/F card 30 having ID=0 via the bus 34. It is thus highly likely that a circuit has not been correctly formed in the FPGA 48 of the communication I/F card 30 having ID=0 for some reasons. Accordingly, in step 110, the CPU 24 of the controller 20 increments the number N (initial value is 0) by which the updating FPGA configuration information for the FPGA 48 has been written by one, and transmits information indicating "updating failed" to the remote maintenance device 16. The CPU 24 of the controller 20 may output the information "updating failed" to, for example, a display device provided in the controller 20. In other words, the CPU 24 may cause the display device to display the information "updating failed".

Figure 10:
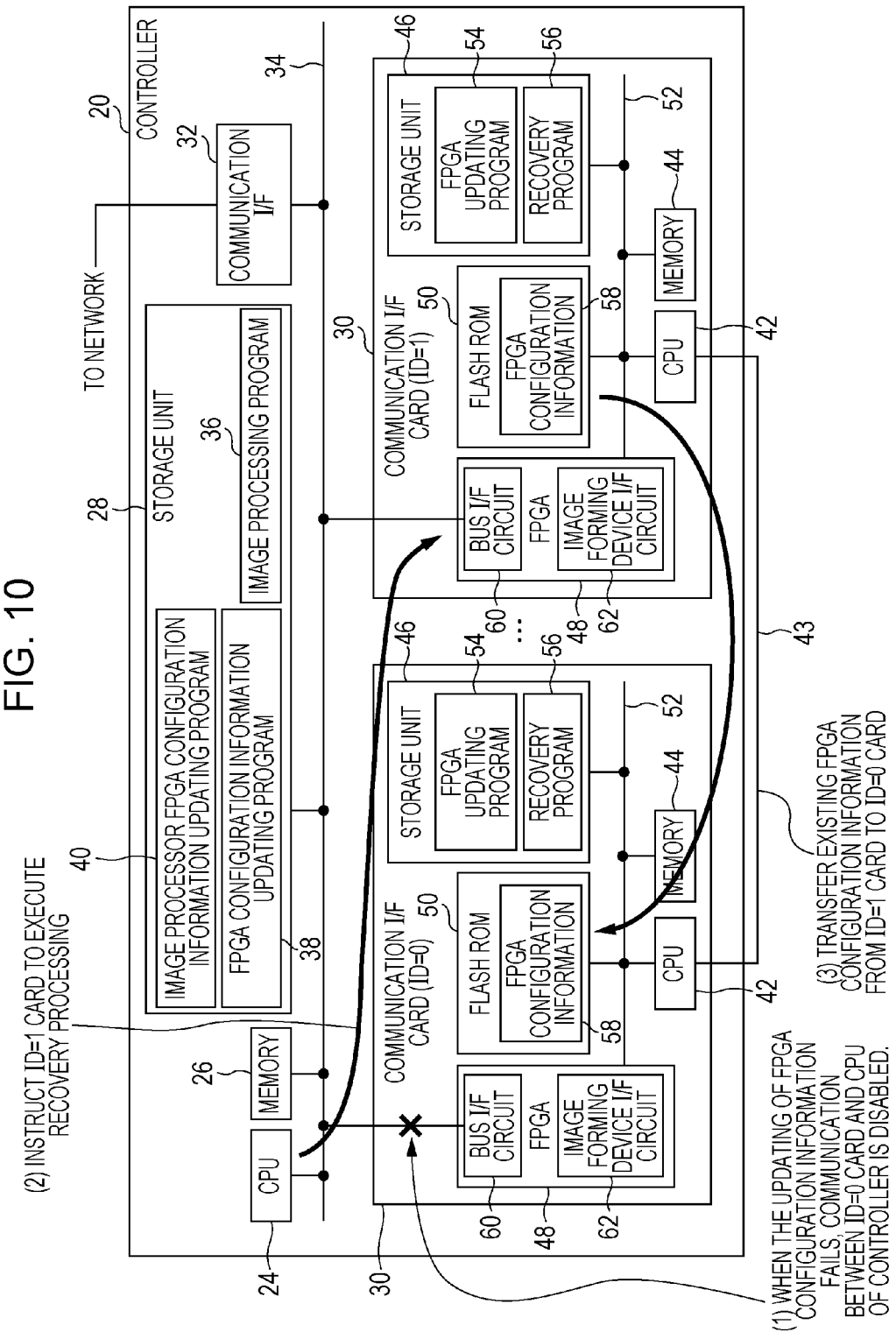
FIG. 10 is a schematic diagram illustrating an example of the flow of FPGA configuration information within the controller.

In step 112, the CPU 24 of the controller 20 determines whether or not the number N is greater than three. If the result of step 112 is NO, the CPU 24 of the controller 20 proceeds to step 114. In step 114, the CPU 24 of the controller 20 instructs the CPU 42 of the communication I/F card 30 having ID=1 to execute recovery processing 1 shown in FIG. 7. In the recovery processing 1, as shown in FIG. 10, the CPU 42 of the communication I/F card 30 having ID=1 transfers the existing version of FPGA configuration information stored in the flash ROM 50 to the communication I/F card 30 having ID=0 via the communication line 43. In this case, it has been verified that the existing version of FPGA configuration information stored in the communication I/F card 30 having ID=1 does not contain any error since the communication I/F card 30 having ID=1 is operating correctly. Then, the new version of FPGA configuration information stored in the flash ROM 50 of the communication I/F card 30 having ID=0 is replaced by the existing version of FPGA configuration information. Details of the recovery processing 1 will be discussed later. After executing step 114, the CPU 24 of the controller 20 returns to step 104 and repeats step 104 and the subsequent steps.

If it is determined in step 108 that an error has not been detected in communication check in step 106, the CPU 24 of the controller 20 proceeds to step 118. In step 118, the CPU 24 of the controller 20 checks the version of the circuit formed in the FPGA 48 of the communication I/F card 30 having ID=0. FPGA 48 sets information indicating the version of FPGA configuration information used for forming a circuit in a register built in the FPGA 48, and this information can be referred to from the outside of the FPGA 48. Accordingly, in step 118, the CPU 24 of the controller 20 refers to the information set in this register and checks the version of the circuit formed in the FPGA 48 against the version of the updating FPGA configuration information transferred to the communication I/F card 30 having ID=0.

Then, in step 120, the CPU 24 of the controller 20 determines whether or not the version of the circuit formed in the FPGA 48 has been updated. If the result of step 120 is YES, it means that the CPU 24 of the controller 20 can correctly perform communication with the communication I/F card 30 having ID=0 via the bus 34 and that the version of the circuit formed in the FPGA 48 has been updated. Thus, the CPU 24 of the controller 20 determines that the updating of the FPGA configuration information in the communication I/F card 30 having ID=0 has succeeded. Then, the CPU 24 of the controller 20 proceeds to step 122.

If the result of step 120 is NO, it may mean that the new version of FPGA configuration information stored in the flash ROM 50 of the communication I/F card 30 having ID=0 has been replaced by the existing version of FPGA configuration information as a result of the CPU 42 of the communication I/F card 30 having ID=1 executing the recovery processing 1. Alternatively, it may mean that a circuit configured in accordance with the existing version of FPGA configuration information is formed in the FPGA 48 of the communication I/F card 30 having ID=0 for some reasons. No matter whichever case it is, it is determined that the updating of FPGA configuration information in the communication I/F card 30 having ID=0 has failed. Accordingly, the CPU 24 of the controller 20 erases the updating FPGA configuration information temporarily stored in the memory 26 and proceeds to step 121. In step 121, the CPU 24 of the controller 20 displays information indicating the occurrence of an error on a display device (not shown) to show that the updating of FPGA configuration information has failed. Then, the CPU 24 of the controller 20 returns to step 102 and repeats step 102 and the subsequent steps.

Then, the following processing operations are performed again. The updating FPGA configuration information is downloaded, the updating FPGA configuration information is written into the flash ROM 50 of the communication I/F card 30 having ID=0, the communication I/F card 30 having ID=0 is restarted, and communication check is performed.

Then, if the result of step 108 is NO and the result of step 120 is YES, the CPU 24 of the controller 20 proceeds to step 122.

If it is determined in step 108 that an error has been detected as a result of performing communication check in step 106, processing for replacing the new version of FPGA configuration information stored in the flash ROM 50 of the communication I/F card 30 having ID=0 by the existing version of FPGA configuration information is also executed, in addition to the above-described processing in step 110. If an error is still detected after executing the series of processing three times in step 110 including the replacement of the new version of FPGA configuration information by the existing version of FPGA configuration information, the result of step 112 becomes YES. Then, the CPU 24 of the processor 20 proceeds to step 116. In this case, the reason why the updating of FPGA configuration information in the communication I/F card 30 having ID=0 has not succeeded may be due to a breakdown of the substrate of the communication I/F card 30 having ID=0 or a fault of the updating FPGA configuration information stored in the storage unit 92 of the remote maintenance device 16. Accordingly, in step S116, the CPU 24 of the controller 20 performs error handling by informing the remote maintenance device 16 of the reason for a failure to update the FPGA configuration information, and then terminates FPGA configuration information updating processing.

After the updating of FPGA configuration information in the communication I/F card 30 having ID=0 has succeeded, in step 122, the CPU 24 of the controller 20 identifies communication I/F cards 30 in which FPGA configuration information has not yet been updated as subject communication I/F cards 30, from among the communication I/F cards 30 provided in the controller 20. In this example, since the total number of communication I/F cards 30 provided in the controller 20 is two, the communication I/F card 30 having ID=1 is identified as a subject communication I/F card 30 in step 122.

Then, in step 124, the CPU 24 of the controller 20 queries the CPU 42 of the communication I/F card 30 identified as the subject communication I/F card 30 in step 122 about the version of the FPGA configuration information stored in the flash ROM 50. Then, the CPU 24 of the controller 20 receives a response from the CPU 42 of the subject communication I/F card 30 and checks the version of the FPGA configuration information included in this response against the version of the updating FPGA configuration information, thereby checking the version of the FPGA configuration information stored in the flash ROM 50 of the subject communication I/F card 30.

In step 126, the CPU 24 of the controller 20 determines whether or not there is a communication I/F card 30 in which the version of the FPGA configuration information stored in the flash ROM 50 is older than that of the updating FPGA configuration information among the subject communication I/F cards 30 (in this example, the communication I/F card 30 having ID=1). If the result of step 126 is NO, it means that there is no communication I/F card 30 in which the FPGA configuration information needs updating, and the CPU 24 of the controller 20 terminates the FPGA configuration information updating processing.

Figure 5B:
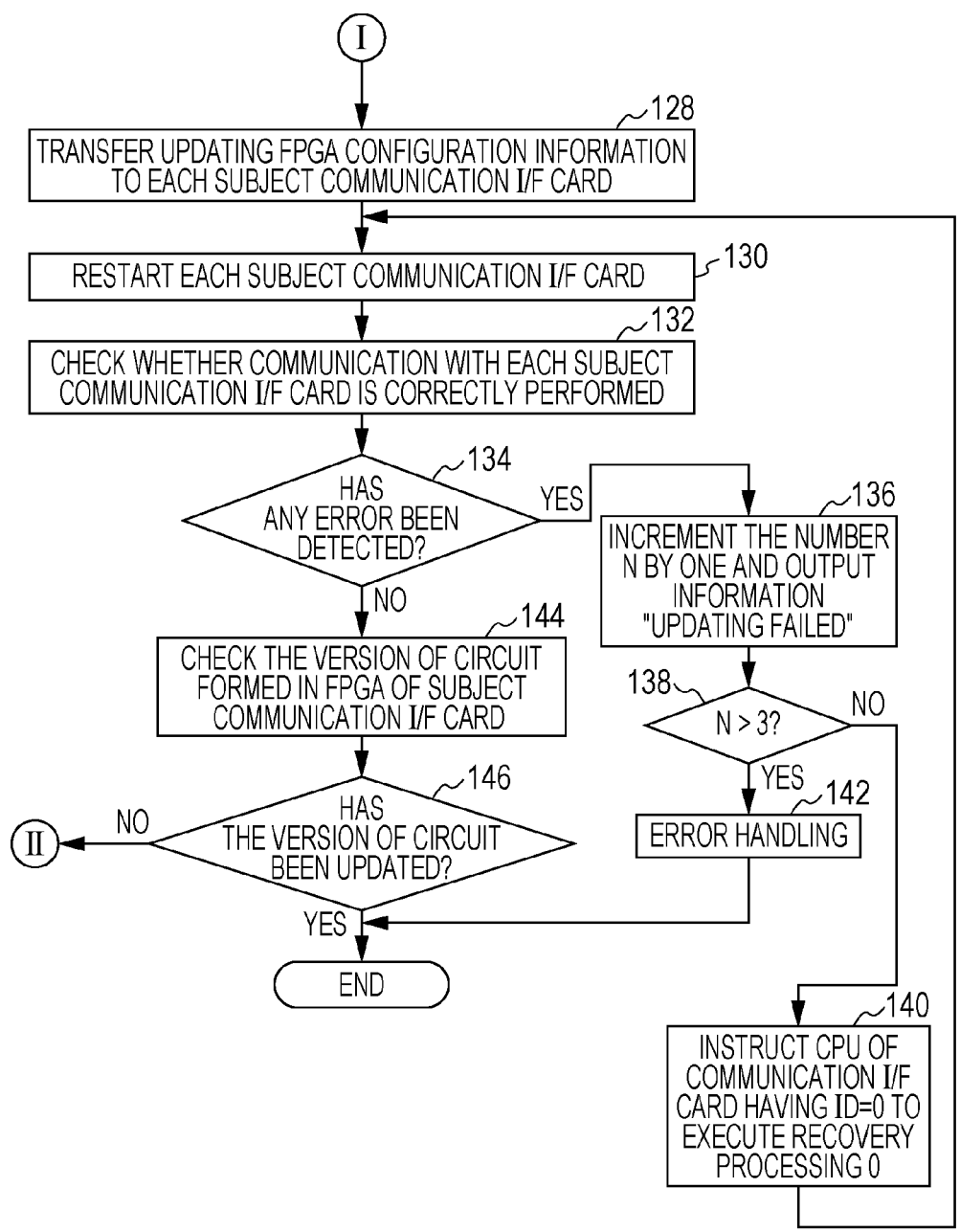

If the result of step 126 is YES, it means that there is a communication I/F card 30 in which FPGA configuration information needs updating, and the CPU 24 of the controller 20 proceeds to step 128 of FIG. 5B. In step 128, the CPU 24 of the controller 20 transfers the updating FPGA configuration information temporarily stored in the memory 26 to the subject communication I/F card 30 (in this example, the communication I/F card 30 having ID=1). In the subject communication I/F card 30, the updating FPGA configuration information transferred from the CPU 24 of the controller 20 is written into the flash ROM 50.

In step 130, upon receiving information that the writing of the updating FPGA configuration information has been completed from the subject communication I/F card 30, the CPU 24 of the controller 20 restarts the subject communication I/F card 30. As a result of restarting the subject communication I/F card 30, in the subject communication I/F card 30, the updating FPGA configuration information is read from the flash ROM 50 and is used for reconfiguring the FPGA 48 (forming a circuit). As a result, in the FPGA 48, circuits configured in accordance with the updating FPGA configuration information (for example, the bus I/F circuit 60 and the image forming device I/F circuit 62) are formed.

Upon completing the restarting of the subject communication I/F card 30 (communication I/F card 30 having ID=1), in step 132, the CPU 24 of the controller 20 checks whether or not it can correctly perform communication with the subject communication I/F card 30 via the bus 34. Then, in step 134, the CPU 24 of the controller 20 determines whether or not there is a subject communication I/F card 30 in which an error has been detected in communication check in step 132 (in this example, whether or not an error has been detected in the communication I/F card 30 having ID=1).

If it is determined in step 132 that an error has been detected, the CPU 24 of the controller 20 proceeds to step 136. In this case, the CPU 24 of the controller 20 is not able to correctly perform communication with the subject communication I/F card 30 (communication I/F card 30 having ID=1) via the bus 34. It is thus highly likely that a circuit has not been correctly formed in the FPGA 48 of the subject communication I/F card 30 for some reasons. Accordingly, in step 136, the CPU 24 of the controller 20 increments the number N (initial value is 0) by which the updating FPGA configuration information for the FPGA 48 has been written by one, and transmits information indicating "updating failed" to the remote maintenance device 16. The CPU 24 of the controller 20 may output the information "updating failed" to a display device provided in the controller 20. In other words, the CPU 24 may cause the display device to display the information "updating failed".

In step 138, the CPU 24 of the controller 20 determines whether or not the number N is greater than three. If the result of step 138 is NO, the CPU 24 of the controller 20 proceeds to step 140. In step 140, the CPU 24 of the controller 20 instructs the CPU 42 of the communication I/F card 30 having ID=0 to execute recovery processing 0 shown in FIG. 8. In the recovery processing 0, the CPU 42 of the communication I/F card 30 having ID=0 transfers the updated FPGA configuration information stored in the flash ROM 50 to the communication I/F card 30 having ID=1 via the communication line 43. In this case, it has been verified that the updated version of FPGA configuration information stored in the communication I/F card 30 having ID=0 does not contain any error since the communication I/F card 30 having ID=0 is operating correctly. Then, the FPGA configuration information stored in the flash ROM 50 of the communication I/F card 30 having ID=1 is overwritten by the updated FPGA configuration information. Details of the recovery processing 0 will be discussed later. After executing step 140, the CPU 24 of the controller 20 returns to step 130 and repeats step 130 and the subsequent steps.

If it is determined in step 134 that an error has not been detected, the CPU 24 of the controller 20 proceeds to step 144. In step 144, the CPU 24 of the controller 20 refers to information indicating the version of the FPGA configuration information set in a register built in the FPGA 48 of the subject communication I/F card (communication I/F card 30 having ID=1), and checks the version of the circuit formed in the FPGA 48 against the version of the updating FPGA configuration information transferred to the subject communication I/F card 30.

Then, in step 146, the CPU 24 of the controller 20 determines whether or not the version of the circuit formed in the FPGA 48 of the subject communication I/F card 30 has been updated. If the result of step 146 is YES, it means that the CPU 24 of the controller 20 can correctly perform communication with the subject communication I/F card 30 via the bus 34 and the version of the circuit formed in the FPGA 48 has been updated. Accordingly, the CPU 24 of the controller 20 determines that the updating of the FPGA configuration information in the subject communication I/F card 30 has succeeded. Thus, if the result of step 146 is YES, the CPU 24 of the controller 20 finishes FPGA configuration information updating processing.

If the result of step 146 is NO, it may mean that a circuit configured in accordance with the existing version of FPGA configuration information is formed in the FPGA 48 of the subject communication I/F card 30 for some reasons. In this case, it is determined that the updating of FPGA configuration information in the subject communication I/F card 30 has failed. Accordingly, the CPU 24 of the controller 20 returns to step 122 and repeats step 122 and the subsequent steps.

Then, the following processing operations are performed again. The updating FPGA configuration information is written into the flash ROM 50 of the subject communication I/F card 30, the subject communication I/F card 30 is restarted, and communication check is performed. As a result, if the result of step 134 is NO and the result of step 146 is YES, the CPU 24 of the controller 20 terminates the FPGA configuration information updating processing.

If it is determined in step 134 that an error has been detected as a result of performing communication check in step 132, processing for overwriting the FPGA configuration information stored in the flash ROM 50 of the subject communication I/F card 30 with the updated FPGA configuration information is also performed, in addition to the above-described processing in step 136.

If an error is still detected after executing the series of processing three times including the overwriting of the FPGA configuration information with the updated FPGA configuration information, the result of step 138 becomes YES. Then, the CPU 24 of the processor 20 proceeds to step 142. In this case, the reason why the updating of FPGA configuration information in the subject communication I/F card 30 has not succeeded may be due to a breakdown of the substrate of the subject communication I/F card 30 or a fault of the updating FPGA configuration information stored in the storage unit 92 of the remote maintenance device 16. Accordingly, in step 142, the CPU 24 of the controller 20 performs error handling by informing the remote maintenance device 16 of the reason for a failure to update the FPGA configuration information, and then terminates the FPGA configuration information updating processing.

A description will now be given, with reference to FIG. 6, of FPGA updating processing executed by a communication I/F card 30 as a result of the CPU 42 of the communication I/F card 30 executing the FPGA updating program 54 while the above-described FPGA configuration information updating processing is being executed by the CPU 24 of the controller 20.

In step 150 of FIG. 6, the CPU 42 of the communication I/F card 30 identifies the ID assigned to the communication I/F card 30 by the CPU 24 of the controller 20. Then, in step 152, the CPU 42 of the communication I/F card 30 checks whether or not local connection (local communication) between the CPU 42 of the communication I/F card 30 and the CPU 42 of another communication I/F card 30 via the communication line 43 is functioning properly. In step 154, the CPU 42 of the communication I/F card 30 determines whether or not an error has been detected in communication check in step 152.

If it is determined in step 154 that an error has been detected in communication check in step 152, the CPU 42 of the communication I/F card 30 proceeds to step 160. The reason for the occurrence of an error may be due to a breakdown of the substrate of the communication I/F card 30 which is executing FPGA updating processing or a bad electrical contact. Accordingly, in step 160, the CPU 42 of the communication I/F card 30 performs error handling by informing the CPU 24 of the controller 20 of the reason for the occurrence of an error, and then terminates FPGA updating processing. In this case, it is preferable that the CPU 24 of the controller 20 inform the remote maintenance device 16 of the reason for the occurrence of an error in communication check.

Even if an error has been detected in the communication I/F card 30 in communication check in step 152, the communication I/F card 30 is still able to perform communication with the CPU 24 of the controller 20 via the bus 34. Accordingly, even if the result of step 154 is YES, the CPU 42 of the communication I/F card 30 may execute steps 156 and 158 after informing the CPU 24 of the controller 20 that local connection (local communication) via the communication line 43 is not properly functioning.

If it is determined in step 154 that an error has not been detected in communication check in step 152, the CPU 42 of the communication I/F card 30 proceeds to step 156. In step 156, the CPU 42 of the communication I/F card 30 temporarily stores the updating FPGA configuration information transferred from the CPU 24 of the controller 20 via the bus 34 in the memory 44, and then overwrites the FPGA configuration information stored in the flash ROM 50 with the updating FPGA configuration information.

Upon completing the writing of the updating FPGA configuration information into the flash ROM 50, the CPU 42 of the communication I/F card 30 proceeds to step 158. In step 158, the CPU 42 of the communication I/F card 30 informs the CPU 24 of the controller 20 that the writing of the updating FPGA configuration information has been completed, and then finishes FPGA updating processing. In this case, when this communication I/F card 30 is restarted, the updating FPGA configuration information is read from the flash ROM 50 and is used for reconfiguring the FPGA 48. As a result, a circuit configured in accordance with the updating FPGA configuration information is formed in the FPGA 48.

As discussed above with reference to FIGS. 5A and 5B, after the updating FPGA configuration information has been written into the flash ROM 50 of the communication I/F card 30 having ID=0, if an error is detected in communication with the CPU 24 of the controller 20 via the bus 34 as a result of restarting the communication I/F card 30 having ID=0, an instruction to execute recovery processing 1 is given from the CPU 24 of the controller 20 to the communication I/F card 30 having ID=1. Upon receiving this instruction, in the communication I/F card 30 having ID=1, recovery processing 1 shown in FIG. 7 is executed as a result of the CPU 42 executing the recovery program 56.

Figure 7:
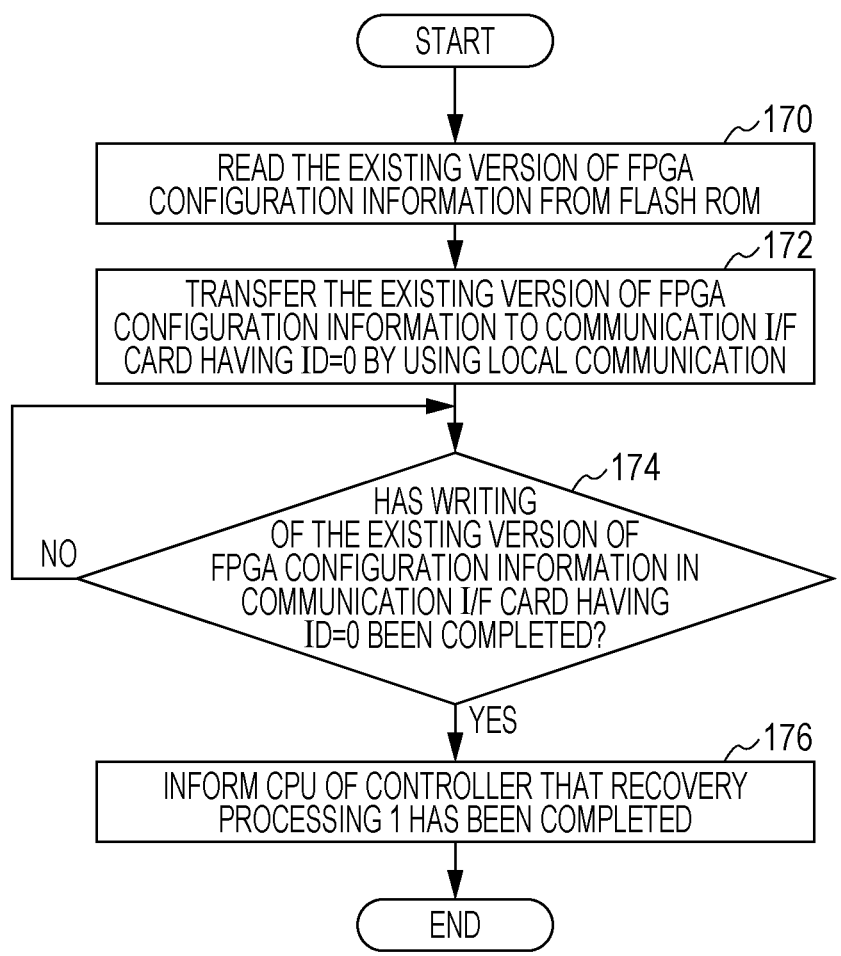
FIG. 7 is a flowchart illustrating recovery processing 1 executed by a CPU of a communication I/F card having ID=1.

In step 170 of FIG. 7, the CPU 42 of the communication I/F card 30 having ID=1 reads the existing version of FPGA configuration information stored in the flash ROM 50 of the communication I/F card 30 having ID=1. Then, in step 172, the CPU 42 of the communication I/F card 30 having ID=1 transfers the existing version of FPGA configuration information read from the flash ROM 50 to the CPU 42 of the communication I/F card 30 having ID=0 by using local communication via the communication line 43.

The CPU 42 of the communication I/F card 30 having ID=0 temporarily stores the existing version of FPGA configuration information transferred by using local communication via the communication line 43 in the memory 44, and then writes the existing version of FPGA configuration information into the flash ROM 50. Upon completing the writing of the existing version of FPGA configuration information, the CPU 42 of the communication I/F card 30 having ID=0 returns a response indicating that recovery processing has been successfully completed to the CPU 42 of the communication I/F card 30 having ID=1. In step 174, on the basis of whether or not this response has been received from the CPU 42 of the communication I/F card 30 having ID=0, the CPU 42 of the communication I/F card 30 having ID=1 determines whether or not the writing of the existing version of FPGA configuration information into the flash ROM 50 of the communication I/F card 30 having ID=0 has been completed. The CPU 42 of the communication I/F card 30 having ID=1 repeats step 174 until the result of step 174 becomes YES.

If the result of step 174 is YES, the CPU 42 of the communication I/F card 30 having ID=1 proceeds to step 176. In step 176, the CPU 42 of the communication I/F card 30 having ID=1 informs the CPU 24 of the controller 20 that recovery processing 1 has been completed, and then finishes recovery processing 1. With this operation, the writing of the existing version of FPGA configuration information into the flash ROM 50 of the communication I/F card 30 having ID=0 has been completed. When the communication I/F card 30 having ID=0 is restarted, communication between the CPU 42 of the communication I/F card 30 having ID=0 and the CPU 24 of the controller 20 via the bus 34 is recovered from a communication failure.

After the updating FPGA configuration information has been written into the flash ROM 50 of the communication I/F card 30 having ID=1, if an error is detected in communication with the CPU 24 of the controller 20 via the bus 34 as a result of restarting the communication I/F card 30 having ID=1, an instruction to execute recovery processing 0 is given from the CPU 24 of the controller 20 to the communication I/F card 30 having ID=0. Upon receiving this instruction, in the communication I/F card 30 having ID=0, recovery processing 0 shown in FIG. 8 is executed as a result of the CPU 42 executing the recovery program 56.

Figure 8:
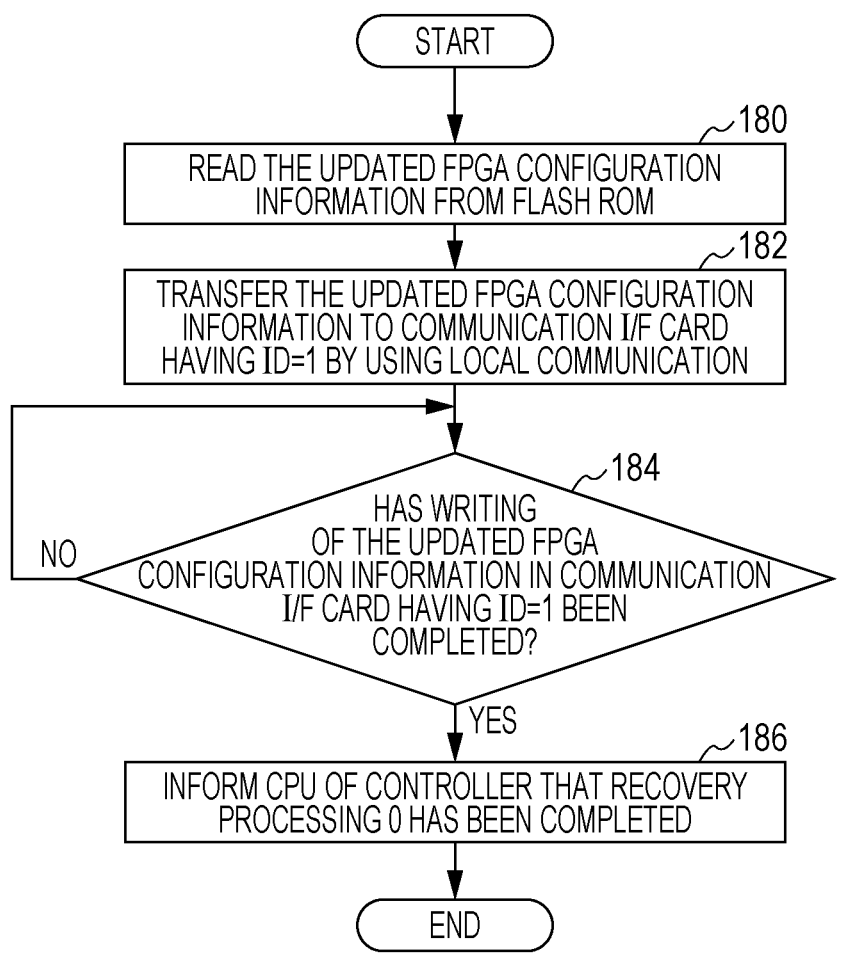
FIG. 8 is a flowchart illustrating recovery processing 0 executed by a CPU of a communication I/F card having ID=0.

In step 180 of FIG. 8, the CPU 42 of the communication I/F card 30 having ID=0 reads the updated FPGA configuration information stored in the flash ROM 50. Then, in step 182, the CPU 42 of the communication I/F card 30 having ID=0 transfers the updated FPGA configuration information read from the flash ROM 50 to the CPU 42 of the communication I/F card 30 having ID=1 by using local communication via the communication line 43.

The CPU 42 of the communication I/F card 30 having ID=1 temporarily stores the updated FPGA configuration information in the memory 44, and then writes the updated FPGA configuration information into the flash ROM 50. Upon completing the writing of the updated FPGA configuration information, the CPU 42 of the communication I/F card 30 having ID=1 returns a response indicating that recovery processing has been successfully completed to the CPU 42 of the communication I/F card 30 having ID=0. In step 184, on the basis of whether or not this response has been received from the CPU 42 of the communication I/F card 30 having ID=1, the CPU 42 of the communication I/F card 30 having ID=0 determines whether or not the writing of the updated FPGA configuration information into the flash ROM 50 of the communication I/F card 30 having ID=1 has been completed. The CPU 42 of the communication I/F card 30 having ID=0 repeats step 184 until the result of step 184 becomes YES.

If the result of step 184 is YES, the CPU 42 of the communication I/F card 30 having ID=0 proceeds to step 186. In step 186, the CPU 42 of the communication I/F card 30 having ID=0 informs the CPU 24 of the controller 20 that recovery processing 0 has been completed, and then finishes recovery processing 0. With this operation, the writing of the updated FPGA configuration information into the flash ROM 50 of the communication I/F card 30 having ID=1 has been completed. When the communication I/F card 30 having ID=1 is restarted, communication between the CPU 42 of the communication I/F card 30 having ID=1 and the CPU 24 of the controller 20 via the bus 34 is recovered from a communication failure.

As described above, in this exemplary embodiment, when the FPGA 48 of the communication I/F card 30 having ID=0 is reconfigured (a circuit is formed) by using a new version of FPGA configuration information written into the flash ROM 50 of the communication I/F card 30 having ID=0, if an error is detected in communication with the CPU 24 of the controller 20 via the bus 34, the FPGA 48 of the communication I/F card 30 having ID=0 is reconfigured by using the existing version of FPGA configuration information written in the flash ROM 50 of the communication I/F card 30 having ID=1. With this operation, communication between the CPU 42 of the communication I/F card 30 having ID=0 and the CPU 24 of the controller 20 via the bus 34 is recovered from a communication failure without the need of manual work, such as the replacement of a substrate of the communication I/F card 30 having ID=0.

In the above-described case, the controller 20 including the communication I/F card 30 having ID=0 and the communication I/F card 30 having ID=1 is an example of an electronic apparatus according to an exemplary embodiment of the invention. The FPGA 48 of the communication I/F card 30 having ID=0 is an example of a circuit forming device according to an exemplary embodiment of the invention. The flash ROM 50 of the communication I/F card 30 having ID=0 is an example of a first storage unit according to an exemplary embodiment of the invention. The flash ROM 50 of the communication I/F card 30 having ID=1 is an example of a second storage unit according to an exemplary embodiment of the invention. The CPU 24 of the controller 20 and the CPU 42 of the communication I/F card 30 having ID=1 are an example of a recovery controller according to an exemplary embodiment of the invention. The communication I/F card 30 is an example of a module according to an exemplary embodiment of the invention. The bus I/F circuit 60 is an example of first and second circuits according to an exemplary embodiment of the invention.

In this exemplary embodiment, when the FPGA 48 of the communication I/F card 30 having ID=1 is reconfigured (a circuit is formed) by using updating FPGA configuration information written into the flash ROM 50 of the communication I/F card 30 having ID=1, if an error is detected in communication with the CPU 24 of the controller 20 via the bus 34, the FPGA 48 of the communication I/F card 30 having ID=1 is reconfigured by using a new version of FPGA configuration information written in the flash ROM 50 of the communication I/F card 30 having ID=0. In this case, it has been verified that communication with the CPU 24 of the controller 20 via the bus 34 has been established by using this new version of FPGA configuration information. With this operation, communication between the CPU 42 of the communication I/F card 30 having ID=1 and the CPU 24 of the controller 20 via the bus 34 is recovered from a communication failure without the need of manual work, such as the replacement of a substrate of the communication I/F card 30 having ID=1.

In the above-described case, the controller 20 including the communication I/F card 30 having ID=0 and the communication I/F card 30 having ID=1 is an example of an electronic apparatus according to an exemplary embodiment of the invention. The FPGA 48 of the communication I/F card 30 having ID=1 is an example of a circuit forming device according to an exemplary embodiment of the invention. The flash ROM 50 of the communication I/F card 30 having ID=1 is an example of a first storage unit according to an exemplary embodiment of the invention. The flash ROM 50 of the communication I/F card 30 having ID=0 is an example of a second storage unit according to an exemplary embodiment of the invention. The CPU 24 of the controller 20 and the CPU 42 of the communication I/F card 30 having ID=0 are an example of a recovery controller according to an exemplary embodiment of the invention. The communication I/F card 30 is an example of a module according to an exemplary embodiment of the invention. The bus I/F circuit 60 is an example of first and second circuits according to an exemplary embodiment of the invention.

Figure 11:
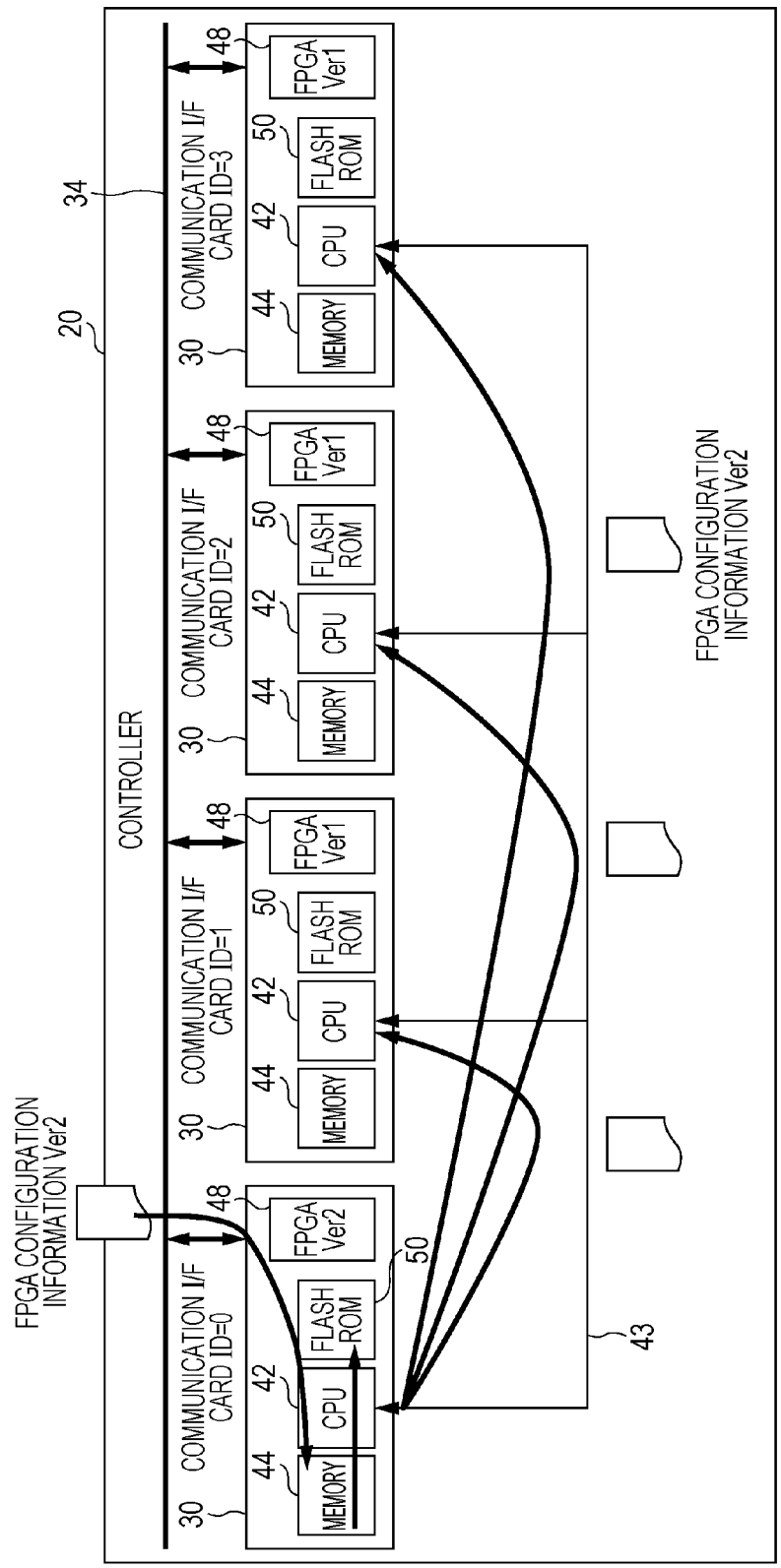
FIG. 11 is a schematic diagram illustrating an example of the flow of FPGA configuration information when four communication I/F cards are provided within a controller.

In the above-described example, the total number of communication I/F cards 30 provided in the controller 20 is two. However, the number of communication I/F cards 30 is not restricted to two, and may be three or more. As an example, the controller 20 including four communication I/F cards 30 is shown in FIG. 11. In this case, as indicated by the arrows in FIG. 11, the updating of FPGA configuration information is performed for the communication I/F card 30 having ID=0. If no communication error occurs, the updating of FPGA configuration information is performed for communication I/F cards 30 having ID=1, ID=2, and ID=3 at the same time. In this case, as shown in FIG. 11, the updating FPGA configuration information may be transferred via the communication line 43 to the communication I/F cards 30 having ID=1, ID=2, and ID=3 from the communication I/F card 30 having ID=0 in which the updating of FPGA configuration information has been completed. Alternatively, the updating FPGA configuration information may be transferred from the CPU 24 of the controller 20 via the bus 34.

The updating of FPGA configuration information stored in the flash ROM 76 of the image processor 64 will be described below. Signals transmitted and received between the controller 20 and the image processor 64 will first be discussed with reference to FIG. 4. Image data and communication commands for transmitting and receiving this image data are transmitted and received between the controller 20 and the image processor 64 via the communication lines 35. Control signal lines different from the communication lines 35 are also disposed between the controller 20 and the image processor 64. The controller 20 and the image processor 64 transmit and receive a MODE signal, a RESET signal, and an I_READY signal via these control signal lines, as indicated by Table 1.

TABLE 1

Control signals transmitted and received between controller and image processor

| | MODE | RESET | I_READY |
|---|---|---|---|
| Normal mode | L | H | L |
| Download mode | H | H | L |
| Abnormality/power off in image processor | — | H | H |
| Reset state | — | L | H |

The MODE signal is a signal transmitted from the controller 20 to the image processor 64. As indicated in Table 1, the MODE signal is set to be the L level in the normal mode and to be the H level in the download mode in which updating FPGA configuration information is transferred from the controller 20 to the image processor 64.

The RESET signal is a signal transmitted from the controller 20 to the image processor 64. As indicated in Table 1, the RESET signal is set to be the L level when the controller 20 instructs the image processor 64 to reset (restart) the image processor 64 and to be the H level in the other states.

The I_READY signal is a signal transmitted from the image processor 64 to the controller 20. The I_READY signal is set to be the L level while communication between the controller 20 and the image processor 64 via the communication line 35 is established, and to be the H level in a case in which an abnormality is occurring in the image processor 46, the image processor 46 is powered OFF, or the image processor 46 is reset (restarted), as indicated in Table 1.

As shown in FIG. 4, the FPGA 74 of the image processor 64 outputs a CONF_DONE signal and a CRC_ERROR signal to the CPU 68. The CONF_DONE signal is set to be the H level while the reconfiguration of the FPGA 74 (formation of a circuit) corresponding to FPGA configuration information is being performed, and is switched to the L level by the FPGA 74 when the reconfiguration of the FPGA 74 corresponding to the FPGA configuration information has been completed.

The CRC_ERROR signal is set to be the H level under the normal conditions, and is switched to the L level by the FPGA 74 upon the occurrence of an error in a parity check conducted for FPGA configuration information input from the configuration circuit 78 to the FPGA 74 during the reconfiguration of the FPGA 74 (formation of a circuit) corresponding to the FPGA configuration information.

As shown in FIG. 4, in the NVM 80, three flags, that is, a MODE flag, a WRITE protect flag, and a FPGA READ flag, are stored. These flags are set by the CPU 68. On the basis of the values of the flags stored in the NVM 80, the configuration circuit 78 selects a storage area from which FPGA configuration information is read and a storage area in which WRITE protect is set, from among three storage areas provided in the flash ROM 76. The relationship between the values of the flags and the storage area from which FPGA configuration information is read and a storage area in which WRITE protect is set is indicated in Table 2.

TABLE 2

Relationship between settings in NVM and access to flash ROM

| | Flag set in NVM | | | |
|---|---|---|---|---|
| State | MODE flag | WRITE protect flag | FPGA READ flag | Flash ROM access control |
| State 1 | 1 | — | — | READ from WP area (download mode) |
| State 2 | 0 | 0 | 0 | READ from area A WRITE protect set in area A |
| State 3 | 0 | 0 | 1 | READ from area B WRITE protect set in area A |
| State 4 | 0 | 1 | 0 | READ from area A WRITE protect set in area B |
| State 5 | 0 | 1 | 1 | READ from area B WRITE protect set in area B |

The MODE flag is set to be 1 if FPGA configuration information is read from the WP area and is set to be 0 in the other states. When the MODE flag is 1, the configuration circuit 78 reads FPGA configuration information from the WP area regardless of the values of the other flags, and outputs the FPGA configuration information to the FPGA 74.

The FPGA READ flag is set to be 0 if FPGA configuration information is read from the area A and is set to be 1 if FPGA configuration information is read from the area B. When the MODE flag is 0 and the FPGA READ flag is 0, the configuration circuit 78 reads FPGA configuration information from the area A and outputs it to the FPGA 74. When the MODE flag is 0 and the FPGA READ flag is 1, the configuration circuit 78 reads FPGA configuration information from the area B and outputs it to the FPGA 74.

The WRITE protect flag is set to be 0 if WRITE protect is set in the area A and is set to be 1 if WRITE protect is set in the area B. When the MODE flag is 0 and the WRITE protect flag is 0, the configuration circuit 78 sets WRITE protect in the area A. When the MODE flag is 0 and the WRITE protect flag is 1, the configuration circuit 78 sets WRITE protect in the area B.

A description will now be given, with reference to FIG. 12, of image processor FPGA configuration information updating processing executed by the CPU 24 of the controller 20 when updating FPGA configuration information stored in the flash ROM 76 of the image processor 64.

The image processor FPGA configuration information updating processing is implemented as a result of the CPU 24 of the controller 20 executing the image processor FPGA configuration information updating program 40. It is assumed that updating FPGA configuration information (a new version of FPGA configuration information) to be used to configure the FPGA 74 of the image processor 64 is received from the remote maintenance device 16 and is stored in the storage unit 28. In this state, when a predetermined situation arises, the CPU 24 of the controller 20 executes image processor FPGA configuration information updating processing. Examples of the predetermined situation is a situation where the image forming system 14 is not receiving print data from the client terminal 12 and the image processor 64 is not performing image processing and a situation where the frequency of the use of the image forming system 14 is decreased to a certain threshold.

In step 200 of FIG. 12, the CPU 24 of the controller 20 switches the MODE signal to be output to the image processor 64 to the H level so as to instruct the CPU 68 of the image processor 64 to shift to the download mode. Then, in step 202, the CPU 24 of the controller 20 switches the RESET signal to be output to the image processor 64 to the L level so as to instruct the CPU 68 of the image processor 64 to restart the image processor 64. In step 204, the CPU 24 of the controller 20 enters the standby state for a predetermined time. As this predetermined time, the time obtained by adding a preset extra time to the time necessary to restart the image processor 64 may be used.

Then, in step 206, the CPU 24 of the controller 20 determines whether or not the I_READY signal input from the image processor 64 has been switched to the L level, thereby checking for the occurrence of any abnormality in the image processor 64. If the I_READY signal is at the H level, it means that some abnormality has occurred in the image processor 64 during the restarting of the image processor 64. Accordingly, if the result of step 206 is NO, the CPU 24 of the controller 20 proceeds to step 228. In step 228, the CPU 24 of the controller 20 performs error handling by informing the remote maintenance device 16 of the occurrence of some abnormality during the restarting of the image processor 64, and then terminates image processor FPGA configuration information updating processing.

On the other hand, if it is determined in step 206 that the I_READY signal has been switched to the L level, the CPU 24 of the controller 20 proceeds to step 208. In step 208, the CPU 24 of the controller 20 reads updating FPGA configuration information to be used to configure the FPGA 74 of the image processor 64 from the storage unit 28, and transfers the updating FPGA configuration information to the image processor 64 via the communication line 35.

Since the I_READY signal has been switched to the L level, communication between the controller 20 and the image processor 64 via the communication line 35 has been established. Accordingly, in step 212, the CPU 24 of the controller 20 determines whether or not any transfer error has occurred in the updating FPGA configuration information, on the basis of whether or not information indicating that the transfer of the updating FPGA configuration information has been completed is received from the image processor 64. If the result of step 212 is YES, the CPU 24 of the controller 20 returns to step 208 and retransfers the updating FPGA configuration information to the image processor 64.

If the result of step S212 is NO, the CPU 24 of the controller 20 proceeds to step 214. In step 214, the CPU 24 of the controller 20 switches the MODE signal to be output to the image processor 64 to the L level so as to instruct the CPU 68 of the image processor 64 to shift to the normal mode. Then, in step 216, the CPU 24 of the controller 20 switches the RESET signal to be output to the image processor 64 to the L level so as to instruct the CPU 68 of the image processor 64 to restart the image processor 64. In step 218, the CPU 24 of the controller 20 enters the standby state for a predetermined time. As this predetermined time, the same period of time as that in step 204 is used.

Then, in step 220, the CPU 24 of the controller 20 determines whether or not the I_READY signal input from the image processor 64 has been switched to the L level, thereby checking for the occurrence of any abnormality in the image processor 64. If the I_READY signal is at the H level, it means that some abnormality has occurred in the image processor 64 during the restarting of the image processor 64. Accordingly, if the result of step 220 is NO, the CPU 24 of the controller 20 proceeds to step 228. In step 228, the CPU 24 of the controller 20 performs error handling by informing the remote maintenance device 16 of the occurrence of some abnormality during the restarting of the image processor 64, and then terminates image processor FPGA configuration information updating processing.

Alternatively, before informing the remote maintenance device 16 of the occurrence of abnormality in the image processor 64, retry processing for repeating image processor FPGA configuration information updating processing from step 200 may be executed. Then, if the I_READY signal is not switched to the L level in step 220 even after this retry processing is executed a predetermined number of times (for example, three times), the CPU 24 of the controller 20 may inform the remote maintenance device 16 of the occurrence of abnormality in the image processor 64.

If it is determined in step 220 that the I_READY signal has been switched to the L level, the CPU 24 of the controller 20 proceeds to step 222. In step 222, the CPU 24 of the controller 20 queries the image processor 64 about the version of the FPGA configuration information used for forming a circuit in the FPGA 74 of the image processor 64. In response to this query, the CPU 68 of the image processor 64 reads information set in a register within the FPGA 74 indicating the version of the FPGA configuration information used for forming a circuit in the FPGA 74, and informs the CPU 24 of the controller 20 of the version.

Then, in step 224, the CPU 24 of the controller 20 determines whether or not the version supplied from the CPU 68 of the image processor 64 coincides with the version of the updating FPGA configuration information stored in the storage unit 28. If the result of step 224 is NO, the CPU 24 of the controller 20 proceeds to step 225. In step 225, the CPU 24 of the controller 20 displays information indicating the occurrence of an error on a display device (not shown) to show that the updating of FPGA configuration information has failed. Then, the CPU 24 of the controller 20 returns to step 200 and executes step 200 and the subsequent steps again for updating FPGA configuration information to be used to configure the FPGA 74 of the image processor 64.

On the other hand, if the result of step 224 is YES, the CPU 24 of the controller 20 proceeds to step 226. In step 226, the CPU 24 of the controller 20 updates version management information concerning FPGA configuration information of the image processor 64 stored in the storage unit 28 to information indicating the version of the updating FPGA configuration information transferred to the image processor 64, and then finishes image processor FPGA configuration information updating processing.

A description will now be given, with reference to FIGS. 13A and 13B, of FPGA updating processing executed by the CPU 68 of the image processor 64 as a result of the CPU 68 executing the FPGA updating program 84. The FPGA updating processing is started upon receiving an instruction to shift to the download mode after the MODE signal input into the image processor 64 from the CPU 24 of the controller 20 has been switched to the H level in step 200 of the above-described image processor FPGA configuration information updating processing (FIG. 12). In this case, it is assumed that the existing version of FPGA configuration information is stored in the area A of the flash ROM 76 and that the previous version of FPGA configuration information is stored in the area B of the flash ROM 76.

In step 230 of FIG. 13A, the CPU 68 of the image processor 64 sets the MODE flag stored in the NVM 80 to be 1. Then, in step 232, the CPU 68 of the image processor 64 restarts the image processor 64 upon receiving an instruction to reset (restart) the image processor 64 after the RESET signal to be input into the image processor 64 from the CPU 24 of the controller 20 has been switched to the L level in step 202 of image processor FPGA configuration information updating processing (FIG. 12).

In this case, since the MODE flag stored in the NVM 80 is set to be 1, in step 236, the configuration circuit 78 reads initial configuration information stored in the WP area of the flash ROM 76 and outputs it to the FPGA 74. The FPGA 74 then forms a circuit configured in accordance with the initial configuration information input from the configuration circuit 78. The initial configuration information is FPGA configuration information without errors, that is, it has been verified at the time of the shipping of the image forming device 22 that a correct circuit would be formed in the FPGA 74 by using this FPGA configuration information. Accordingly, without the occurrence of any abnormality in the substrate of the image processor 64, it is certain that the controller I/F circuit 88 and the image processing circuit 90 which will operate properly will be formed in the FPGA 74.

A backup of the previous version of FPGA configuration information stored in the flash ROM 76 may be created.

In step 240, on the basis of whether or not the CRC_ERROR signal input from the FPGA 74 is maintained at the H level and the CONF_DONE signal has been switched from the H level to the L level, the CPU 68 of the image processor 64 determines whether or not a circuit configured in accordance with the initial configuration information has been formed in the FPGA 74 without any abnormality. If the result of step 240 is NO, the CPU 68 of the image processor 64 proceeds to step 248 to perform error handling.

As error handling, the following processing may be executed. Retry processing including the restarting of the image processor 64 and error checking is repeated, and if the image processor 64 is successfully restarted without any error before this retry processing is executed a predetermined number of times (for example, three times), the CPU 68 of the image processor 64 may proceed to normal processing (step S242). If retry processing is executed the predetermined number of times, the CPU 68 of the image processor 64 may output an instruction to conduct suitable work according to the situation, such as a connection check or the replacement of a substrate or a cable of the image processor 64.

On the other hand, if the result of step 240 is YES, the CPU 68 of the image processor 64 proceeds to step 242. In step 242, the CPU 68 of the image processor 64 switches the I_READY signal to be transmitted to the controller 20 from the H level to the L level so as to inform the CPU 24 of the controller 20 that communication between the controller 20 and the image processor 64 via the communication line 35 has been established.

As a result of the CPU 68 of the image processor 64 switching the I_READY signal to the L level, in step 208 of image processor FPGA configuration information updating processing (FIG. 12), the updating FPGA configuration information to be used to configure the FPGA 74 of the image processor 64 is transferred from the CPU 24 of the controller 20 to the image processor 64. In step 244, the CPU 68 of the image processor 64 writes the received updating FPGA configuration information into the area B of the flash ROM 76.

In step 246, the CPU 68 of the image processor 64 first reads the updating FPGA configuration information from the area B of the flash ROM 76 and checks whether or not this updating FPGA configuration information coincides with the updating FPGA configuration information received from the CPU 24 of the controller 20. Then, the CPU 68 of the image processor 64 determines whether or not an error has occurred during the writing of the updating FPGA configuration information into the area B of the flash ROM 76. If the result of step 246 is YES, the CPU 68 of the image processor 64 proceeds to step 248 and performs error handling.

As error handling, the following processing may be executed. Retry processing for writing the updating FPGA configuration information again into the area B of the flash ROM 76 is repeated, and if the updating FPGA configuration information is successfully written without any error before this retry processing is executed a predetermined number of times (for example, three times), the CPU 68 of the image processor 64 may proceed to normal processing (step S250). If retry processing is executed the predetermined number of times, the CPU 68 of the image processor 64 may output an instruction to conduct suitable work according to the situation, such as a connection check or the replacement of a substrate or a cable of the image processor 64.

If the result of step 246 is NO, the CPU 68 of the image processor 64 proceeds to step 250. In step 250, the CPU 68 of the image processor 64 sets the MODE flag stored in the NVM 80 to be 0 (normal operation), the FPGA READ flag to be 1 (reading FPGA configuration information from the area B), and the WRITE protect flag to be 0 (protecting the area A). In step 252, the CPU 68 of the controller 64 informs the CPU 24 of the controller 20 that the transferring of the updating FPGA configuration information has been completed.

Upon receiving this information, in step 214 of image processor FPGA configuration information updating processing (FIG. 12), the MODE signal to be input into the image processor 64 from CPU 24 of the controller 20 is switched to the L level so as to instruct the CPU 68 of the image processor 64 to shift to the normal mode. Then, in step 216, the RESET signal to be input into the image processor 64 from the CPU 24 of the controller 20 is switched to the L level so as to instruct the CPU 68 of the image processor 64 to reset (restart) the image processor 64. Then, in step 254, upon receiving an instruction to reset (restart) the image processor 64 after the RESET signal has been switched to the L level, the CPU 68 of the image processor 64 restarts the image processor 64.

In the NVM 80, the MODE flag is 0, the FPGA READ flag is 1, and the WRITE protect flag is 0. Accordingly, in step 256, the configuration circuit 78 sets WRITE protect in the area A of the flash ROM 76 and reads the updating FPGA configuration information from the area B and outputs it to the FPGA 74. Then, the FPGA 74 forms a circuit configured in accordance with the updating FPGA configuration information input from the configuration circuit 78.

When the CONF_DONE signal input from the FPGA 74 is switched from the H level to the L level, the CPU 68 of the image processor 64 proceeds to step 260. In step 260, the CPU 68 of the image processor 64 checks whether or not communication with the CPU 24 of the controller 20 via the controller I/F circuit 88 formed in the FPGA 74 is functioning properly. Then, in step 262 of FIG. 13B, on the basis of the result of communication check in step 260, the CPU 68 of the image processor 64 determines whether or not communication with the CPU 24 of the controller 20 via the controller I/F circuit 88 has been established within a predetermined time.

If the result of step 262 is YES, the CPU 68 of the image processor 64 proceeds to step 268. In step 268, the CPU 68 of the image processor 64 switches the I_READY signal to be transmitted to the controller 20 from the H level to the L level. In this case, the CPU 68 of the image processor 64 informs the CPU 24 of the controller 20 of the version of the FPGA configuration information. Then, in step 226 of image processor FPGA configuration information updating processing (FIG. 12), the CPU 24 of the controller 20 updates version management information concerning the FPGA configuration information of the image processor 64.

Then, in step 270, the CPU 68 of the image processor 64 sets the WRITE protect flag stored in the NVM 80 to be 1 (protect the area B), and then finishes FPGA updating processing. With this operation, thereafter, the new version of FPGA configuration information stored in the area B of the flash ROM 76 can be protected from being destroyed, for example, by overwriting.

A description will now be given of processing to be executed in a case in which, after a circuit is formed in the FPGA 74 by using the updating FPGA configuration information stored in the area B of the flash ROM 76, communication with the CPU 24 of the controller 20 has not been established within a predetermined time. That is, if the result of step 262 is NO, the CPU 68 of the image processor 64 proceeds to step 272. In step 272, the CPU 68 of the image processor 64 reads the CRC_ERROR signal output from the FPGA 74. Then, in step 274, on the basis of whether or not the CRC_ERROR signal has been switched from the H level to the L level, the CPU 68 of the image processor 64 determines whether or not an error has occurred in a parity check conducted for FPGA configuration information by the FPGA 74.

If the result of step 274 is YES, the CPU 68 of the image processor 64 proceeds to step 276. In step 276, the CPU 68 of the image processor 64 obtains the version of the FPGA configuration information written into the area B of the flash ROM 76, and then records information concerning, for example, the obtained version in a log, which may be used for conducting error analysis later. The CPU 68 of the image processor 64 then proceeds to step 278. If the result of step 274 is NO, the CPU 68 of the image processor 64 proceeds to step 278 by skipping step 276.

In step 278, the CPU 68 of the image processor 64 sets the FPGA READ flag stored in the NVM 80 to be 0 (reading the FPGA configuration information from the area A). In step 280, the CPU 68 of the image processor 64 restarts the image processor 64.

In the NVM 80, the MODE flag is 0, the FPGA READ flag is 0, and the WRITE protect flag is 0. Accordingly, in step 282, the configuration circuit 78 sets WRITE protect in the area A of the flash ROM 76 and reads the existing FPGA configuration information stored in the area A and outputs it to the FPGA 74. Then, the FPGA 74 forms a circuit configured in accordance with the existing version of FPGA configuration information input from the configuration circuit 78.

When the CONF_DONE signal input from the FPGA 74 is switched from the H level to the L level, the CPU 68 of the image processor 64 proceeds to step 286. In step 286, the CPU 68 of the image processor 64 checks whether or not communication with the CPU 24 of the controller 20 via the controller I/F circuit 88 formed in the FPGA 74 is functioning properly. Then, in step 288, on the basis of the result of communication check in step 286, the CPU 68 of the image processor 64 determines whether or not communication with the CPU 24 of the controller 20 via the controller I/F circuit 88 has been established within a predetermined time.

If the result of step 288 is YES, the CPU 68 of the image processor 64 proceeds to step 300. If the result of step 288 is NO, the CPU 68 of the image processor 64 proceeds to step 290. In step 290, the CPU 68 of the image processor 64 displays information indicating the occurrence of an error on a display device (not shown) to show that the updating of FPGA configuration information has failed, and then terminates FPGA updating processing.

In FPGA updating processing (FIGS. 13A and 13B) of this exemplary embodiment, the CPU 68 of the image processor 64 proceeds to step 300 if the result of step 288 is YES. In this case, the updating of FPGA configuration information in the image processor 64 has failed. Accordingly, in step 300, for specifying the reason for a failure to update FPGA configuration information, the CPU 68 of the image processor 64 determines whether or not the history indicating the occurrence of a CRC error in a parity check for the FPGA configuration information during the execution of FPGA updating processing is stored.

If a CRC error has occurred in a parity check for the FPGA configuration information, the reason why the updating of FPGA configuration information has failed may be due to the mixture of an error (garbled data) during the transfer of the FPGA configuration information. Accordingly, if the result of step 300 is YES, the CPU 68 of the image processor 64 proceeds to step 302. In step 302, the CPU 68 of the image processor 64 performs error handling by informing the remote maintenance device 16 via the controller 20 that the updating of FPGA configuration information has failed due to a transfer error, for example. In this case, if necessary, the remote maintenance device 16 redistributes updating FPGA configuration information used for forming a circuit in the FPGA 74 to the controller 20.

If a CRC error has not occurred in a parity check for the FPGA configuration information, the reason why the updating of FPGA configuration information has failed may be that FPGA configuration information containing an error has been created as updating FPGA configuration information. Accordingly, if the result of step 300 is NO, the CPU 68 of the image processor 64 proceeds to step 304. In step 304, the CPU 68 of the image processor 64 performs error handling by informing the remote maintenance device 16 via the controller 20 that the updating of FPGA configuration information has failed due to an error contained in the updating FPGA configuration information distributed from the remote maintenance device 16, for example. In this case, if necessary, suitable work, such as the checking of the updating FPGA configuration information distributed from the remote maintenance device 16, is conducted by the operator of the remote maintenance device 16.

The above-described image processor FPGA configuration information updating processing (FIG. 12) and FPGA updating processing (FIGS. 13A and 13B) are executed every time FPGA configuration information used for forming a circuit in the FPGA 74 is updated. In accordance with the execution of the image processor FPGA configuration information updating processing and FPGA updating processing, the area A and the area B of the flash ROM 76 are changed. An example of the transition of the area A and the area B is shown in FIG. 14.

FPGA configuration information of version 1.0 is stored in the area A of the flash ROM 76, and WRITE protect is set in the area A, while no FPGA configuration information is stored in the area B (initial state in FIG. 14). In this state, if the updating of FPGA configuration information has succeeded, the FPGA configuration information of version 1.0 is stored in the area A, while FPGA configuration information of version 2.0 is stored in the area B, and WRITE protect is set in the area B. As a result, the FPGA configuration information is ready to be read from the area B (Update 1 state shown in FIG. 14).

In this state, if the updating of FPGA configuration information has succeeded, FPGA configuration information of version 3.0 is stored in the area A, and WRITE protect is set in the area A, while the FPGA configuration information of version 2.0 is stored in the area B. As a result, the FPGA configuration information is ready to be read from the area A (Update 2 state shown in FIG. 14).

It is now assumed that, in this state, the updating of FPGA configuration information fails, and then, by transferring corrected FPGA configuration information, the updating of FPGA configuration information succeeds. In this case, at the time when the updating of FPGA configuration information has failed, FPGA configuration information of version 3.0 is stored in the area A, and FPGA configuration information of version 4.0 is stored in the area B. However, since communication has not been established by using the FPGA configuration information of version 4.0, WRITE protect is set in the area A, and the FPGA configuration information is ready to be read from the area A (the first line in Fault 1 state in FIG. 14). Then, when the updating of FPGA configuration information has succeeded as a result of transferring the corrected FPGA configuration information (FPGA configuration information of version 4.1), the FPGA configuration information of version 3.0 is stored in the area A, while the FPGA configuration information of version 4.1 is stored in the area B, and WRITE protect is set in the area B. In this state, the FPGA configuration information is ready to be read from the area B (the second line in Fault 1 state in FIG. 14).

In this state, if the updating of FPGA configuration information has succeeded, FPGA configuration information of version 5.0 is stored in the area A, and WRITE protect is set in the area A, while FPGA configuration information of version 4.1 is stored in the area B. In this state, the FPGA configuration information is ready to be read from the area A (Update 3 state in FIG. 14).

In this exemplary embodiment, when the FPGA 74 of the image processor 64 is reconfigured (a circuit is formed) by using updating FPGA configuration information written into the area B of the flash ROM 76 of the image processor 64, if an error is detected in communication with the CPU 24 of the controller 20 via the communication line 35, the FPGA 74 is reconfigured by using the existing version of FPGA configuration information written in the area A of the flash ROM 76. With this operation, communication between the CPU 68 of the image processor 64 and the CPU 24 of the controller 20 via the communication line 35 is recovered from a communication failure without the need of manual work, such as the replacement of a substrate of the image processor 64.

In the above-described case, the image forming device 22 is an example of an electronic apparatus according to an exemplary embodiment of the invention. The FPGA 74 is an example of a circuit forming device according to an exemplary embodiment of the invention. The area B of the flash ROM 76 is an example of a first storage unit according to an exemplary embodiment of the invention. The area A of the flash ROM 76 is an example of a second storage unit according to an exemplary embodiment of the invention. The CPU 68 of the image processor 64, the NVM 80, and the configuration circuit 78 are an example of a recovery controller according to an exemplary embodiment of the invention. The controller I/F circuit 88 is an example of first and second circuits according to an exemplary embodiment of the invention.

When the FPGA 74 of the image processor 64 is reconfigured (a circuit is formed) by using updating FPGA configuration information written into the area A of the flash ROM 76 of the image processor 64, if an error is detected in communication with the CPU 24 of the controller 20 via the communication line 35, the FPGA 74 is reconfigured by using the existing version of FPGA configuration information written in the area B of the flash ROM 76. With this operation, communication between the CPU 68 of the image processor 64 and the CPU 24 of the controller 20 via the communication line 35 is recovered from a communication failure without the need of manual work, such as the replacement of a substrate of the image processor 64. In this case, the area A of the flash ROM 76 is an example of a first storage unit according to an exemplary embodiment of the invention, and the area B of the flash ROM 76 is an example of a second storage unit according to an exemplary embodiment of the invention. A detailed explanation of this case has been omitted since the operation is the same as that given in the exemplary embodiment.

In the above-described exemplary embodiment, when the FPGA 74 is reconfigured (a circuit is formed) by using updating FPGA configuration information, if communication with the CPU 24 of the controller 20 via the communication line 35 has successfully been established, it is determined whether or not the version of the FPGA configuration information used for forming a circuit in the FPGA 74 coincides with the version of the updating FPGA configuration information. If the two versions are different, the FPGA 74 is reconfigured by using the existing version of FPGA configuration information. In this manner, if the version of the FPGA configuration information used for forming a circuit in the FPGA 74 is different from the version of the updating FPGA configuration information, the updating of FPGA configuration information is treated as an error.

In the above-described exemplary embodiment, when the FPGA 74 is reconfigured by using updating FPGA configuration information stored in the area B of the flash ROM 76 in the state in which WRITE protect is set in the area A of the flash ROM 76, if communication with the CPU 24 of the controller 20 via the communication line 35 has successfully been established, WRITE protect is set in the area B of the flash ROM 76. It is thus possible to prevent the accidental deletion of a new version of FPGA configuration information after communication with the CPU 24 of the controller 20 via the communication line 35 has been established by using the circuit formed by using this FPGA configuration information.

In the above-described exemplary embodiment, when receiving updating FPGA configuration information via the communication line 35, the FPGA 74 is reconfigured by using the initial configuration information written in the WP area of the flash ROM 76 in advance. Thus, the probability that the updating FPGA configuration information will be successfully received is enhanced.

In the above-described exemplary embodiment, a first circuit and a second circuit according to an exemplary embodiment of the invention have the same configuration with different versions. However, the invention is not restricted to this, and the configurations of the first circuit and the second circuit may be different.

In the above-described exemplary embodiment, a FPGA has been discussed as an example of the circuit forming device. However, this is only an example, and other programmable logic devices, such as a simple programmable logic device (SPLC), a complex programmable logic device (CPLD), a digital application processor (DAP)/distributed network architecture (DNA), and other devices may be used as the circuit forming device.

In the above-described exemplary embodiment, the present invention is applied to the controller 20 and the image processor 64 of the image forming device 22 in the print system 10. However, the invention is not restricted to these elements. The invention is applicable to any electronic apparatus including a circuit forming device in which a circuit implementing a function including a communication function is formed by using configuration information.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
   a programmable circuit that forms a circuit configured in accordance with configuration information;
   a first memory in which first configuration information is stored, the first configuration information being externally obtained via a first communication line in a state in which a circuit which implements a first communication function of performing communication via the first communication line is at least formed in the programmable circuit, the first configuration information being used for forming a first circuit which implements a function including the first communication function in the programmable circuit;
   a second memory in which second configuration information, which is different from the first configuration information, is stored, the second configuration information being used for forming a second circuit which implements a function including the first communication function in the programmable circuit; and
   a recovery controller that performs control so that the second circuit will be formed in the programmable circuit by using the second configuration information, upon an occurrence of an error in communication via the first communication line when the first circuit is formed in the programmable circuit by using the first configuration information, wherein:
   a plurality of communication elements are provided, each communication element including the programmable circuit and a memory;
   the plurality of communication elements are connected to each other via a second communication line, and a second communication function of performing communication via the second communication line is implemented by a circuit other than the programmable circuit included in each of the communication elements; and
   in a state in which the first configuration information is stored in the memory of a specific communication element among the plurality of communication elements and the second configuration information is stored in the memory of a different communication element among the plurality of communication elements, upon the occurrence of the error in communication via the first communication line when the first circuit is formed in the programmable circuit of the specific communication element by using the first configuration information stored in the memory of the specific communication element, the recovery controller performs control so that the second configuration information stored in the memory of the different communication element will be transferred to the specific communication element via the second communication line and will be stored in the memory of the specific communication element and so that the second circuit will be formed in the programmable circuit of the specific communication element by using the second configuration information stored in the memory of the specific communication element.

2. The electronic apparatus according to claim 1, wherein it is verified that communication via the first communication line is established in a case in which the second circuit is formed in the programmable circuit by using the second configuration information.

3. The electronic apparatus according to claim 1, further comprising:
a first configuration information updating controller that performs control so that the first configuration information externally received via the first communication line will be stored in the memory of the specific communication element among the plurality of communication elements and so that the first configuration information will be transferred to the different communication element among the plurality of communication elements and will be stored in the memory of the different communication element in a case in which it is verified that communication via the first communication line is established when the first circuit is formed in the programmable circuit of the specific communication element by using the first configuration information stored in the memory of the specific communication element.

4. The electronic apparatus according to claim 1, wherein:
a version of the first configuration information and a version of the second configuration information are different from each other; and
the recovery controller performs control so that the second circuit will be formed in the programmable circuit by using the second configuration information in a case in which communication via the first communication line is established when the first circuit is formed in the programmable circuit by using the first configuration information and in a case in which a version of the first circuit formed in the programmable circuit is different from the version of the first configuration information.

5. The electronic apparatus according to claim 1, wherein:
a version of the first configuration information and a version of the second configuration information are different from each other; and
the electronic apparatus further comprises
a third memory in which initial configuration information is stored, the initial configuration information being used for forming, in the programmable circuit, an initial version of a circuit which implements a function including the first communication function of performing communication via the first communication line, wherein it is verified that communication via the first communication line is established when the initial version of the circuit is formed in the programmable circuit by using the initial configuration information, and
a third configuration information updating controller that performs control so that the initial version of the circuit will be formed in the programmable circuit by using the initial configuration information in a case in which a new version of configuration information is externally received via the first communication line and is stored in the first memory.

6. The electronic apparatus according to claim 1, wherein:
the electronic apparatus is a controller included in an image forming system, the image forming system including an image forming device that forms an image on a basis of received image data and the recovery controller that is connected to the image forming device via a communication line and transmits image data to the image forming device via the communication line, and the first circuit and the second circuit implement a function including a third communication function of performing communication with the image forming device via the communication line which connects the image forming device and the recovery controller;
the electronic apparatus is the image forming device included in the image forming system, and the first circuit and the second circuit implement a function including the first communication function of performing communication with the recovery controller via the communication line which connects the image forming device and the recovery controller acting as the first communication line.

7. An electronic apparatus comprising:
a programmable circuit that forms a circuit configured in accordance with configuration information;
a first memory in which first configuration information is stored, the first configuration information being externally obtained via a first communication line in a state in which a circuit which implements a first communication function of performing communication via the first communication line is at least formed in the programmable circuit, the first configuration information being used for forming a first circuit which implements a function including the first communication function in the programmable circuit;
a second memory in which second configuration information, which is different from the first configuration information, is stored, the second configuration information being used for forming a second circuit which implements a function including the first communication function in the programmable circuit; and
a recovery controller that performs control so that the second circuit will be formed in the programmable circuit by using the second configuration information, upon an occurrence of an error in communication via the first communication line when the first circuit is formed in the programmable circuit by using the first configuration information, wherein:
write protect information is mutually exclusively set in the first memory and the second memory so as to protect the first memory and the second memory from being written; and
the electronic apparatus further comprises
a second configuration information updating controller that performs control so that, in a state in which the write protect information is set in the second memory, if communication via the first communication line is established when the first circuit is formed in the programmable circuit by using the first configuration information, the state in which the write protect information is set in the second memory will be switched to a state in which the write protect information is set in the first memory.

8. The electronic apparatus according to claim 7, wherein it is verified that communication via the first communication line is established in a case in which the second circuit is formed in the programmable circuit by using the second configuration information.

9. The electronic apparatus according to claim 7, wherein:
a version of the first configuration information and a version of the second configuration information are different from each other; and
the recovery controller performs control so that the second circuit will be formed in the programmable circuit by using the second configuration information in a case in which communication via the first communication line is established when the first circuit is formed in the programmable circuit by using the first configuration information and in a case in which a version of the first circuit formed in the programmable circuit is different from the version of the first configuration information.

10. The electronic apparatus according to claim 7, wherein:
a version of the first configuration information and a version of the second configuration information are different from each other; and
the electronic apparatus further comprises
a third memory in which initial configuration information is stored, the initial configuration information being used for forming, in the programmable circuit, an initial version of a circuit which implements a function including the first communication function of performing communication via the first communication line, wherein it is verified that communication via the first communication line is established when the initial version of the circuit is formed in the programmable circuit by using the initial configuration information, and
a third configuration information updating controller that performs control so that the initial version of the circuit will be formed in the programmable circuit by using the initial configuration information in a case in which a new version of configuration information is externally received via the first communication line and is stored in the first memory.

11. The electronic apparatus according to claim 7, wherein:
the electronic apparatus is a controller included in an image forming system, the image forming system including an image forming device that forms an image on a basis of received image data and the controller that is connected to the image forming device via a communication line and transmits image data to the image forming device via the communication line, and the first circuit and the second circuit implement a function including a third communication function of performing communication with the image forming device via the communication line;
the electronic apparatus is the image forming device included in the image forming system, and the first circuit and the second circuit implement a function including the first communication function of performing communication with the controller via the communication line which connects the image forming device and the controller as the first communication line.

* * * * *